United States Patent
Winkler et al.

(10) Patent No.: US 12,118,971 B2
(45) Date of Patent: Oct. 15, 2024

(54) AIRCRAFT ACOUSTIC PANEL

(71) Applicant: B/E AEROSPACE, INC., Winston Salem, NC (US)

(72) Inventors: Julian Winkler, Glastonbury, CT (US); Kenji Homma, Glastonbury, CT (US); Craig A. Reimann, Vernon, CT (US); Jeffrey M. Mendoza, Manchester, CT (US); Paul R. Braunwart, Hebron, CT (US)

(73) Assignee: B/E AEROSPACE, INC., Winston Salem, NC (US)

( * ) Notice: Subject to any disclaimer, the term of this patent is extended or adjusted under 35 U.S.C. 154(b) by 259 days.

(21) Appl. No.: 17/720,174

(22) Filed: Apr. 13, 2022

(65) Prior Publication Data

US 2022/0366886 A1 Nov. 17, 2022

Related U.S. Application Data

(63) Continuation-in-part of application No. 17/318,868, filed on May 12, 2021, now Pat. No. 11,804,206.

(51) Int. Cl.
*G10K 11/162* (2006.01)
*B64D 11/00* (2006.01)
*G10K 11/172* (2006.01)

(52) U.S. Cl.
CPC ............ *G10K 11/162* (2013.01); *B64D 11/00* (2013.01); *G10K 11/172* (2013.01)

(58) Field of Classification Search
CPC ..... B64D 11/00; G10K 11/172; G10K 11/162
See application file for complete search history.

(56) References Cited

U.S. PATENT DOCUMENTS

| | | | | |
|---|---|---|---|---|
| 4,135,603 | A | * 1/1979 | Dean, III | G10K 11/172 428/116 |
| 6,069,840 | A | * 5/2000 | Griffin | F16F 15/04 181/207 |
| 6,098,926 | A | 8/2000 | Morgenthaler | |
| 6,116,375 | A | 9/2000 | Lorch et al. | |
| 6,179,086 | B1 | * 1/2001 | Bansemir | G10K 11/172 181/290 |

(Continued)

FOREIGN PATENT DOCUMENTS

| | | |
|---|---|---|
| CN | 109501404 | 3/2019 |
| CN | 111219433 | 6/2020 |

(Continued)

OTHER PUBLICATIONS

USPTO; Advisory Action dated Jan. 25, 2024 in U.S. Appl. No. 17/318,898.

(Continued)

*Primary Examiner* — Forrest M Phillips
(74) *Attorney, Agent, or Firm* — SNELL & WILMER L.L.P.

(57) ABSTRACT

An acoustic supercell may comprise a facesheet having a plurality of perforations, a backplate parallel to the facesheet, a cell wall contacting the facesheet and the back plate, and a periodic structure. The supercell may be custom-tailored to meet specific acoustic wavelength absorption targets. The custom-tailored supercell may be arranged with a plurality of other custom-tailored supercells into an acoustic panel.

20 Claims, 17 Drawing Sheets

(56) References Cited

U.S. PATENT DOCUMENTS

| | | | |
|---|---|---|---|
| 6,358,590 B1 | 3/2002 | Blair et al. | |
| 7,018,172 B2 | 3/2006 | Prasad et al. | |
| 7,076,956 B2 | 7/2006 | Young et al. | |
| 7,311,175 B2 | 12/2007 | Proscia et al. | |
| 7,334,998 B2 | 2/2008 | Jones et al. | |
| 7,540,354 B2 * | 6/2009 | Morin | F02K 1/827 428/116 |
| 7,607,287 B2 | 10/2009 | Reba et al. | |
| 8,820,477 B1 * | 9/2014 | Herrera | G10K 11/168 181/292 |
| 9,520,121 B2 | 12/2016 | Sheng et al. | |
| 10,066,548 B2 | 9/2018 | Gilson et al. | |
| 10,107,191 B2 | 10/2018 | Gilson et al. | |
| 10,113,559 B2 | 10/2018 | Turner et al. | |
| 10,209,009 B2 | 2/2019 | Gerstler et al. | |
| 10,371,381 B2 | 8/2019 | Xu | |
| 10,704,841 B2 * | 7/2020 | Manzo | B22F 3/1115 |
| 10,724,739 B2 | 7/2020 | Kim et al. | |
| 10,823,409 B2 | 11/2020 | Bertoldi et al. | |
| 11,261,738 B2 | 3/2022 | Chakrabarti et al. | |
| 2005/0284690 A1 * | 12/2005 | Proscia | G10K 11/172 181/210 |
| 2007/0012508 A1 | 1/2007 | Demers | |
| 2009/0166127 A1 | 7/2009 | Thomas et al. | |
| 2011/0284689 A1 | 11/2011 | Thomas et al. | |
| 2013/0219922 A1 | 8/2013 | Gilson et al. | |
| 2018/0299066 A1 | 10/2018 | Erno et al. | |
| 2020/0010028 A1 * | 1/2020 | Suzuki | G10K 11/16 |
| 2020/0101690 A1 | 4/2020 | Oishi et al. | |
| 2020/0191101 A1 | 6/2020 | Boardman et al. | |
| 2020/0378111 A1 | 12/2020 | Fishman et al. | |
| 2020/0384695 A1 | 12/2020 | Mardjono et al. | |
| 2020/0386154 A1 | 12/2020 | Gilson et al. | |
| 2021/0074255 A1 | 3/2021 | Guo et al. | |
| 2021/0095617 A1 | 4/2021 | Richter et al. | |
| 2021/0231057 A1 | 7/2021 | Livebardon et al. | |
| 2021/0372286 A1 * | 12/2021 | Chakrabarti | B22F 3/1115 |

FOREIGN PATENT DOCUMENTS

| | | |
|---|---|---|
| DE | 102017205515 | 9/2021 |
| EP | 2239420 | 1/2016 |
| EP | 3179071 | 6/2017 |
| EP | 3636550 | 4/2020 |
| EP | 3869499 | 8/2021 |
| EP | 4089669 | 11/2022 |
| GB | 2361035 | 10/2001 |
| GB | 2471845 | 1/2011 |
| WO | 2005100753 | 10/2005 |
| WO | 2011034469 | 3/2011 |
| WO | 2013130295 | 9/2013 |
| WO | 2014105108 | 7/2014 |
| WO | 2019103596 | 5/2019 |
| WO | 2020122886 | 6/2020 |
| WO | 2020221976 | 11/2020 |

OTHER PUBLICATIONS

USPTO; Final Office Action dated Nov. 1, 2023 in U.S. Appl. No. 17/318,898.

European Patent Office, European Search Report dated Oct. 4, 2022 in Application No. 22172325.7.

European Patent Office, European Search Report dated Oct. 4, 2022 in Application No. 22173018.7.

Guo Jingwen Et A: "Wideband low frequency sound absorption by inhomogeneous multi-layer resonators with extended necks", Composite Structures, Elsevier Science Ltd, GB, vol. 260, Jan. 6, 2021 (Jan. 6, 2021).

Li Dingzeyu et al: "Acoustin voxels", ACM Transactions on Graphics, ACM, NY, US, vol. 35, No. 4, Jul. 11, 2016 (Jul. 11, 2016).

USPTO; Non-Final Office Action dated Nov. 10, 2022 in U.S. Appl. No. 17/535,270.

USPTO; Corrected Notice of Allowance dated Jun. 30, 2023 in U.S. Appl. No. 17/535,270.

USPTO; Notice of Allowance dated Jul. 3, 2023 in U.S. Appl. No. 17/318,868.

USPTO; Corrected Notice of Allowance dated Jul. 26, 2023 in U.S. Appl. No. 17/318,868.

USPTO; Notice of Allowance dated Sep. 20, 2023 in U.S. Appl. No. 17/503,285.

USPTO; Non-Final Office Action dated Feb. 28, 2023 in U.S. Appl. No. 17/318,868.

European Patent Office, European Search Report dated Mar. 24, 2023 in Application No. 22201750.1.

European Patent Office, European Search Report dated Apr. 14, 2023 in Application No. 22207011.2.

USPTO; Notice of Allowance dated Jun. 16, 2023 in U.S. Appl. No. 17/535,270.

USPTO; Non-Final Office Action dated Jun. 8, 2023 in U.S. Appl. No. 17/318,898.

USPTO; Non-Final Office Action dated Mar. 23, 2023 in U.S. Appl. No. 17/503,285.

USPTO; Non-Final Office Action dated Feb. 23, 2024 in U.S. Appl. No. 17/318,898.

European Patent Office, European Office Action dated Mar. 22, 2024 in Application No. 22172325.7.

* cited by examiner

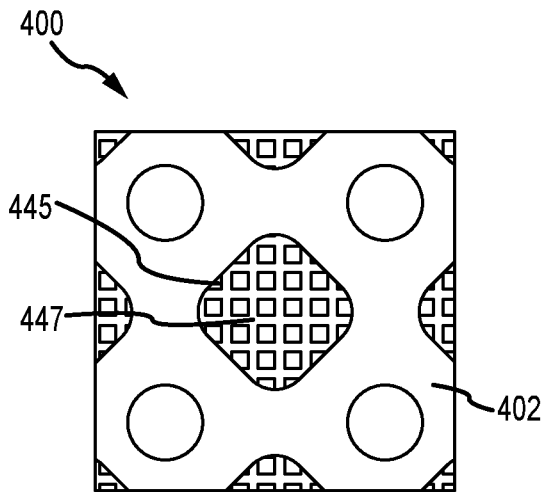
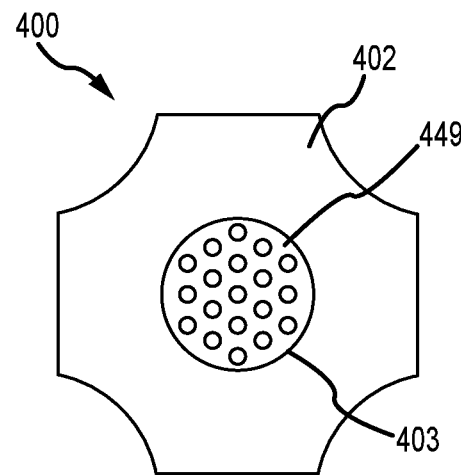
FIG.4A                FIG.4B
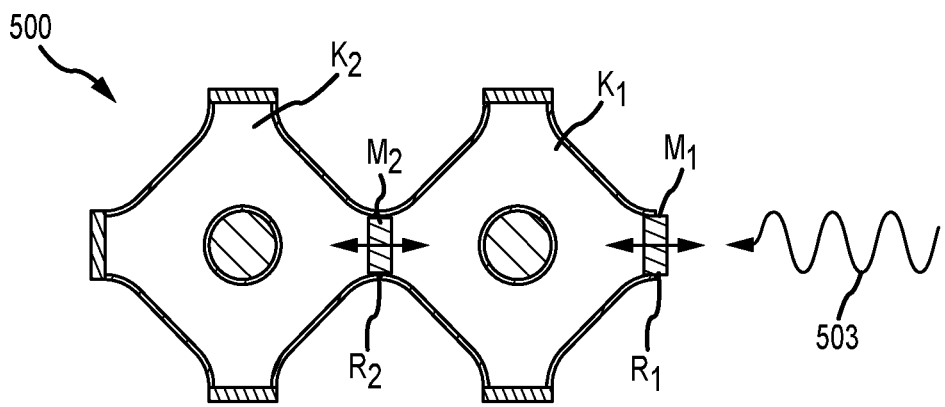
FIG.5A
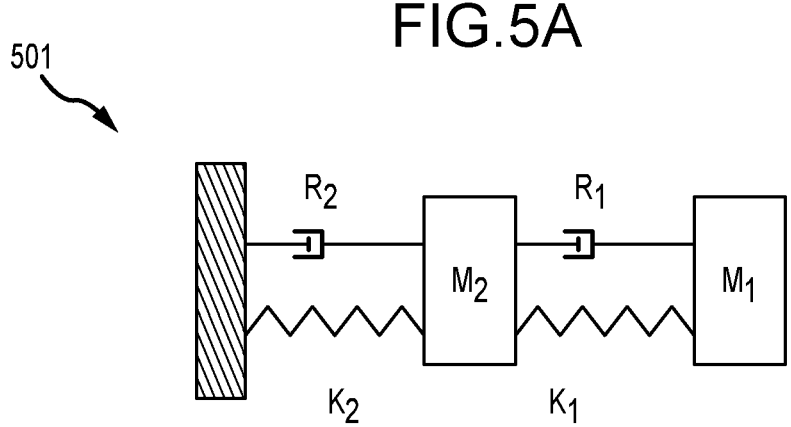
FIG.5B

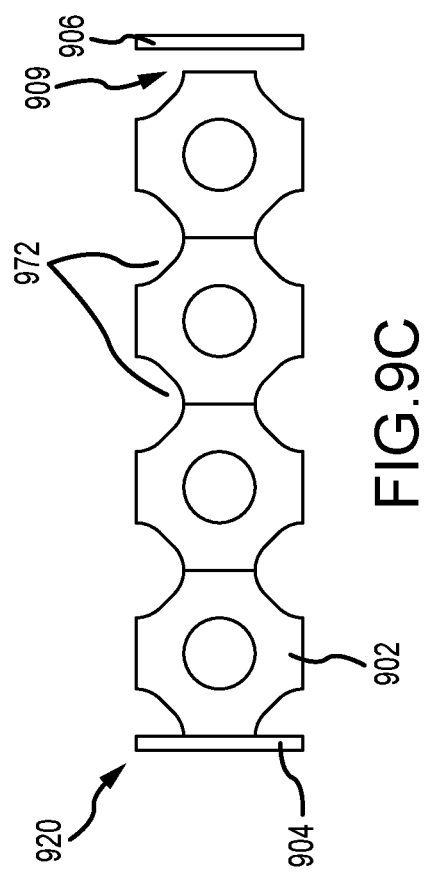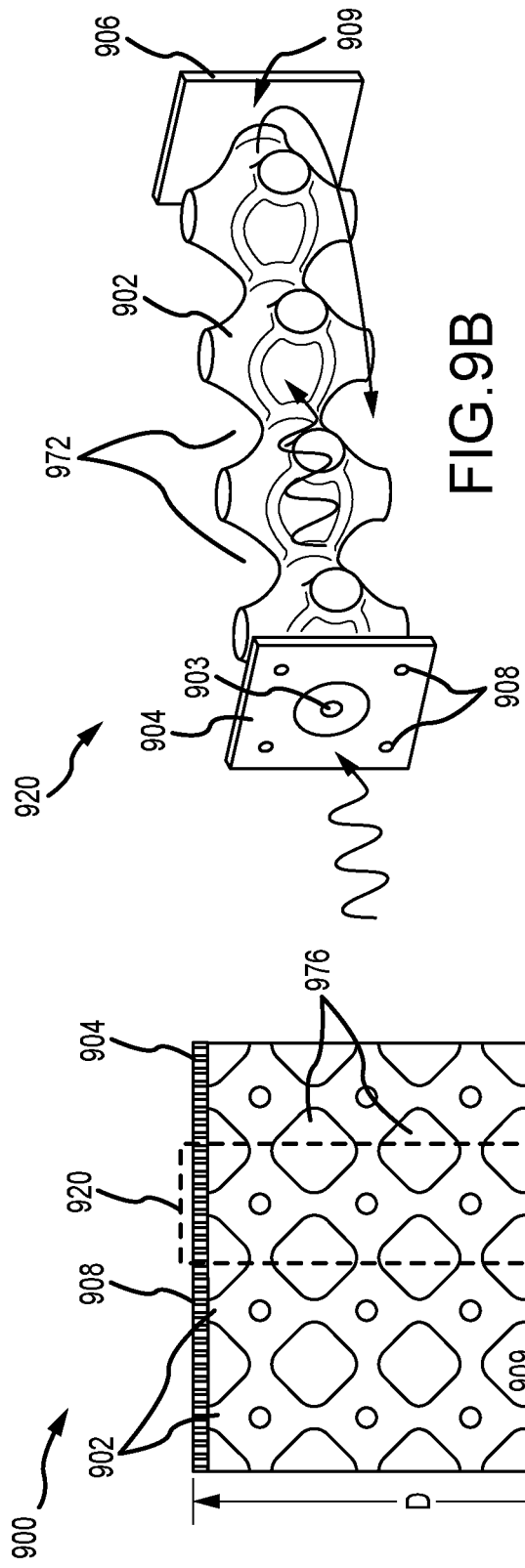

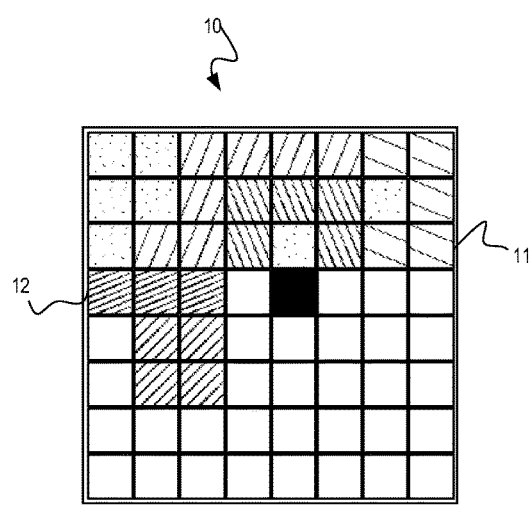
FIG. 11A
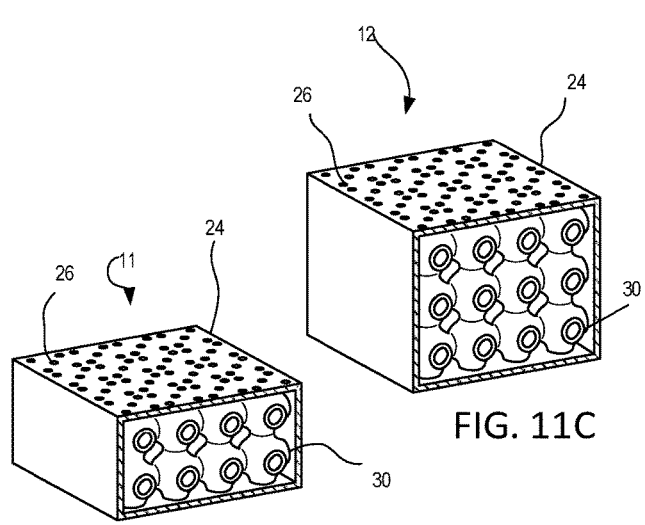
FIG. 11B
FIG. 11C

AIRCRAFT ACOUSTIC PANEL

CROSS-REFERENCE TO RELATED APPLICATIONS

The present application is a continuation-in-part application of U.S. application Ser. No. 17/318,868, filed May 12, 2021. The disclosure of U.S. application Ser. No. 17/318,868, filed May 12, 2021, is incorporated by reference herein in its entirety.

FIELD

The present disclosure relates generally to attenuation structures for reducing acoustic noise and, more particularly, to acoustic panels for reducing noise within passenger vehicles, such as, for example, aircraft (fixed wing and rotorcraft) and seacraft or within other structures, such as, for example, homes, offices or other buildings.

BACKGROUND

Acoustic panels may be used for noise suppression or attenuation in aerospace applications and other fields. The panels typically comprise two skin surfaces that sandwich between them at least one layer of a core material or structure. The two skins and the core structure may be bonded together or cured or otherwise formed together, but mechanical fastening is also used in some applications. The core structure ties the skins together structurally and can form a very rigid, efficient and lightweight structure for noise suppression or attenuation useful in aerospace applications, such as for example, in cabins or other areas of passenger aircraft. The panels may be given acoustic properties by perforating one skin (typically an air washed side of the panel) with specifically sized holes. This enables the cells of the core structure to act like individual Helmholtz or quarter-wave resonators that attenuate a certain tone or tones, at specific frequencies or wavelengths, of noise generated outside an aircraft—e.g., by an engine or airflow over the fuselage—or noise generated within an aircraft—e.g., by personal audio/visual equipment, galley equipment or air management equipment. Left unattenuated or under-attenuated, the noise may adversely impact the comfort or health of passengers and crew members occupying the cabins of aircraft, seacraft or other passenger vessels or of persons occupying homes, offices or buildings.

SUMMARY

An acoustic attenuation structure is disclosed. In various embodiments, the acoustic attenuation structure includes a periodic structure having a first unit cell, the first unit cell having a first central body and a first axial tube disposed on the first central body and a second axial tube disposed on the first central body, opposite the first axial tube, each of the first axial tube and the second axial tube being in fluid communication with one another through the first central body.

In various embodiments, the first unit cell includes a first lateral tube, disposed on and in fluid communication with the first central body, and a second lateral tube, opposite the first lateral tube and disposed on and in fluid communication with the first central body. In various embodiments, the first unit cell includes a third lateral tube, disposed on and in fluid communication with the first central body, and a fourth lateral tube, opposite the third lateral tube and disposed on and in fluid communication with the first central body. In various embodiments, each of the first axial tube, the second axial tube, the first lateral tube, the second lateral tube, the third lateral tube and the fourth lateral tube are in fluid communication with each other via the first central body.

In various embodiments, at least one of the first axial tube, the second axial tube, the first lateral tube, the second lateral tube, the third lateral tube or the fourth lateral tube is completely sealed. In various embodiments, at least one of the first axial tube, the second axial tube, the first lateral tube, the second lateral tube, the third lateral tube or the fourth lateral tube is completely sealed via a wall configured to block a flow of fluid therethrough. In various embodiments, at least one of the first axial tube, the second axial tube, the first lateral tube, the second lateral tube, the third lateral tube or the fourth lateral tube is partially sealed. In various embodiments, at least one of the first axial tube, the second axial tube, the first lateral tube, the second lateral tube, the third lateral tube or the fourth lateral tube is partially sealed via a mesh or a perforated or similar structure, configured to partially restrict a flow of fluid therethrough.

In various embodiments, the acoustic attenuation structure further includes a second unit cell interconnected to the first unit cell, the second unit cell having a second central body and a pair of axial tubes disposed and a pair of lateral tubes disposed on and in fluid communication with the second central body. In various embodiments, the first lateral tube of the first unit cell is interconnected to one of the pair of lateral tubes of the second unit cell. In various embodiments, the acoustic attenuation structure further incudes a third unit cell interconnected to the first unit cell and a fourth unit cell interconnected to the second unit cell and to the third unit cell.

In various embodiments, each of the first unit cell, the second unit cell, the third unit cell and the fourth unit cell are comprised within a layer of unit cells. In various embodiments, a hole is formed extending between the first unit cell, the second unit cell, the third unit cell and the fourth unit cell. In various embodiments, the layer of unit cells is one of a plurality of layers of unit cells. In various embodiments, a facesheet having a plurality of perforations is in fluid communication with the layer of unit cells.

A noise attenuation panel is disclosed. In various embodiments, the noise attenuation panel includes a first periodic structure having a first unit cell, a second unit cell, a third unit cell and a fourth unit cell, wherein each of the first unit cell, the second unit cell, the third unit cell and the fourth unit cell includes a central body interconnected via a plurality of lateral tubes extending from the central body, the first periodic structure forming a first lateral layer of unit cells; and a facesheet and a back plate configured to enclose the first periodic structure.

In various embodiments, the noise attenuation panel further includes a second periodic structure, the second periodic structure forming a second lateral layer of unit cells interconnected to the first lateral layer of unit cells. In various embodiments, the second lateral layer of unit cells is interconnected to the first lateral layer of unit cells via a plurality of axial tubes. In various embodiments, the first lateral layer of unit cells and the second lateral layer of unit cells each comprise a plurality of holes extending axially between adjacent pairs of unit cells that comprise the first lateral layer of unit cells and the second lateral layer of unit cells and the plurality of holes defines a space exterior to the first lateral layer of unit cells, the space being either partially restricted or completely restricted by a hole mesh. In various embodiments, the facesheet includes a plurality of perforations is in fluid communication with the first lateral layer of unit cells and one or more unit cells comprised within an Nth layer of unit cells is spaced a gap from the back plate.

An acoustic supercell is also disclosed herein. In various embodiments, the acoustic supercell may comprise a facesheet having a plurality of perforations. In various embodiments, the acoustic supercell may comprise a back plate parallel to the facesheet. In various embodiments, the acoustic supercell may comprise a cell wall contacting the facesheet and the back plate. The cell wall may be substantially orthogonal to the facesheet and the back plate. In various embodiments, the acoustic supercell may comprise a periodic structure having a first unit cell. In various embodiments, the first unit cell may have a first central body and a first axial tube disposed on the first central body and a second axial tube disposed on the first central body, opposite the first axial tube, each of the first axial tube and the second axial tube being in fluid communication with one another through the first central body. In various embodiments, the facesheet, the back plate, and the cell wall may be in fluid communication with the periodic structure, wherein the facesheet, the back plate, and the cell wall may be configured to enclose the periodic structure.

In various embodiments, the first unit cell includes a first lateral tube, disposed on and in fluid communication with the first central body, and a second lateral tube, opposite the first lateral tube and disposed on and in fluid communication with the first central body. In various embodiments, the first unit cell includes a third lateral tube, disposed on and in fluid communication with the first central body, and a fourth lateral tube, opposite the third lateral tube and disposed on and in fluid communication with the first central body. In various embodiments, each of the first axial tube, the second axial tube, the first lateral tube, the second lateral tube, the third lateral tube and the fourth lateral tube are in fluid communication with each other via the first central body.

In various embodiments, at least one of the first axial tube, the second axial tube, the first lateral tube, the second lateral tube, the third lateral tube or the fourth lateral tube is completely sealed. In various embodiments, at least one of the first axial tube, the second axial tube, the first lateral tube, the second lateral tube, the third lateral tube or the fourth lateral tube is completely sealed via a wall configured to block a flow of fluid therethrough. In various embodiments, at least one of the first axial tube, the second axial tube, the first lateral tube, the second lateral tube, the third lateral tube or the fourth lateral tube is partially sealed. In various embodiments, at least one of the first axial tube, the second axial tube, the first lateral tube, the second lateral tube, the third lateral tube or the fourth lateral tube is partially sealed via a mesh or a perforated or similar structure, configured to partially restrict a flow of fluid therethrough.

In various embodiments, the acoustic supercell further includes a second unit cell interconnected to the first unit cell, the second unit cell having a second central body and a pair of axial tubes disposed and a pair of lateral tubes disposed on and in fluid communication with the second central body. In various embodiments, the first lateral tube of the first unit cell is interconnected to one of the pair of lateral tubes of the second unit cell. In various embodiments, the acoustic supercell further incudes a third unit cell interconnected to the first unit cell and a fourth unit cell interconnected to the second unit cell and to the third unit cell.

In various embodiments, each of the first unit cell, the second unit cell, the third unit cell and the fourth unit cell are comprised within a layer of unit cells. In various embodiments, a hole is formed extending between the first unit cell, the second unit cell, the third unit cell and the fourth unit cell. In various embodiments, the layer of unit cells is one of a plurality of layers of unit cells.

An acoustic panel is also disclosed herein. In various embodiments, the acoustic panel may comprise a first supercell tuned to a first frequency. In various embodiments, the acoustic panel may comprise a second supercell tuned to a second frequency. In various embodiments, each supercell may comprise a facesheet having a plurality of perforations. In various embodiments, each supercell may comprise a back plate parallel to the facesheet. Each supercell may comprise a cell wall contacting the facesheet and the back plate. In various embodiments, the cell wall may be substantially orthogonal to the facesheet and the back plate.

In various embodiments, each supercell may comprise a first periodic structure having a first unit cell, a second unit cell, a third unit cell and a fourth unit cell, wherein each of the first unit cell, the second unit cell, the third unit cell and the fourth unit cell includes a central body interconnected via a plurality of lateral tubes extending from the central body, the first periodic structure forming a first lateral layer of unit cells. In various embodiments, the facesheet, the back plate, and the cell wall may be in fluid communication with the periodic structure.

In various embodiments, the acoustic panel may comprise a second periodic structure. In various embodiments, the second periodic structure may form a second lateral layer of unit cells interconnected to the first lateral layer of unit cells. In various embodiments, the second lateral layer of unit cells is interconnected to the first lateral layer of unit cells via a plurality of axial tubes. In various embodiments, the first lateral layer of unit cells and the second lateral layer of unit cells each comprise a plurality of holes extending axially between adjacent pairs of unit cells that comprise the first lateral layer of unit cells and the second lateral layer of unit cells and wherein the plurality of holes defines a space exterior to the first lateral layer of unit cells, the space being either partially restricted or completely restricted by a hole mesh.

An acoustic supercell is also disclosed herein. In various embodiments, the acoustic supercell may comprise a first periodic structure having a first unit cell, a second unit cell, a third unit cell and a fourth unit cell, wherein each of the first unit cell, the second unit cell, the third unit cell and the fourth unit cell includes a central body interconnected via a plurality of lateral tubes extending from the central body, the first periodic structure forming a first lateral layer of unit cells.

In various embodiments, the acoustic supercell may comprise an outer facesheet parallel to the first periodic structure. In various embodiments, the acoustic supercell may comprise a back plate parallel to the outer facesheet. In various embodiments, the acoustic supercell may comprise a cell wall contacting the outer facesheet and the back plate. The cell wall may be substantially orthogonal to the outer facesheet and the back plate. In various embodiments, the cell wall may further comprise an outer facesheet wall portion. The outer facesheet, the first periodic structure, and the outer facesheet wall portion may define an airgap. The outer facesheet, the back plate, and the cell wall may be configured to enclose the first periodic structure.

In various embodiments, the acoustic supercell may comprise an inner facesheet having a plurality of perforations. The inner facesheet may be disposed between the first periodic structure and the outer facesheet. The inner facesheet may be parallel to the outer facesheet. The outer facesheet, the inner facesheet, and the outer facesheet wall portion may define an airgap. The inner facesheet, the back plate, and the cell wall may be in fluid communication with the first periodic structure. The inner facesheet, the back plate, and the cell wall may be configured to enclose the first periodic structure.

In various embodiments, the cell wall may define a plurality of apertures. In various embodiments, the outer facesheet may be a non-permeable membrane. In various embodiments, the outer facesheet may be a microporous membrane.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 4A and 4B are schematic illustrations of noise attenuation panels for use in an aircraft, other transport vehicle, or within other structures, such as, for example, homes, offices or other buildings, in accordance with various embodiments;

FIGS. 5A and 5B are schematic illustrations of noise attenuation panels for use in an aircraft, other transport vehicle, or within other structures, such as, for example, homes, offices or other buildings, and a model used to analyze the attenuation properties of such noise attenuation panels, in accordance with various embodiments;

FIGS. 9A, 9B and 9C are schematic illustrations of a noise attenuation panel of the present disclosure, in accordance with various embodiments;

FIG. 11A is a schematic view of an acoustic panel comprising a plurality of custom tailored noise attenuation supercells, in accordance with various embodiments; and schematic of a noise attenuation super-cell comprising a noise attenuation panel having a plurality of interconnected unit cells, in accordance with various embodiments;

FIGS. 11B and 11C are schematic views of the custom-tailored noise attenuation supercells of FIG. 11A, in accordance with various embodiments;

DETAILED DESCRIPTION

Figure 1A:
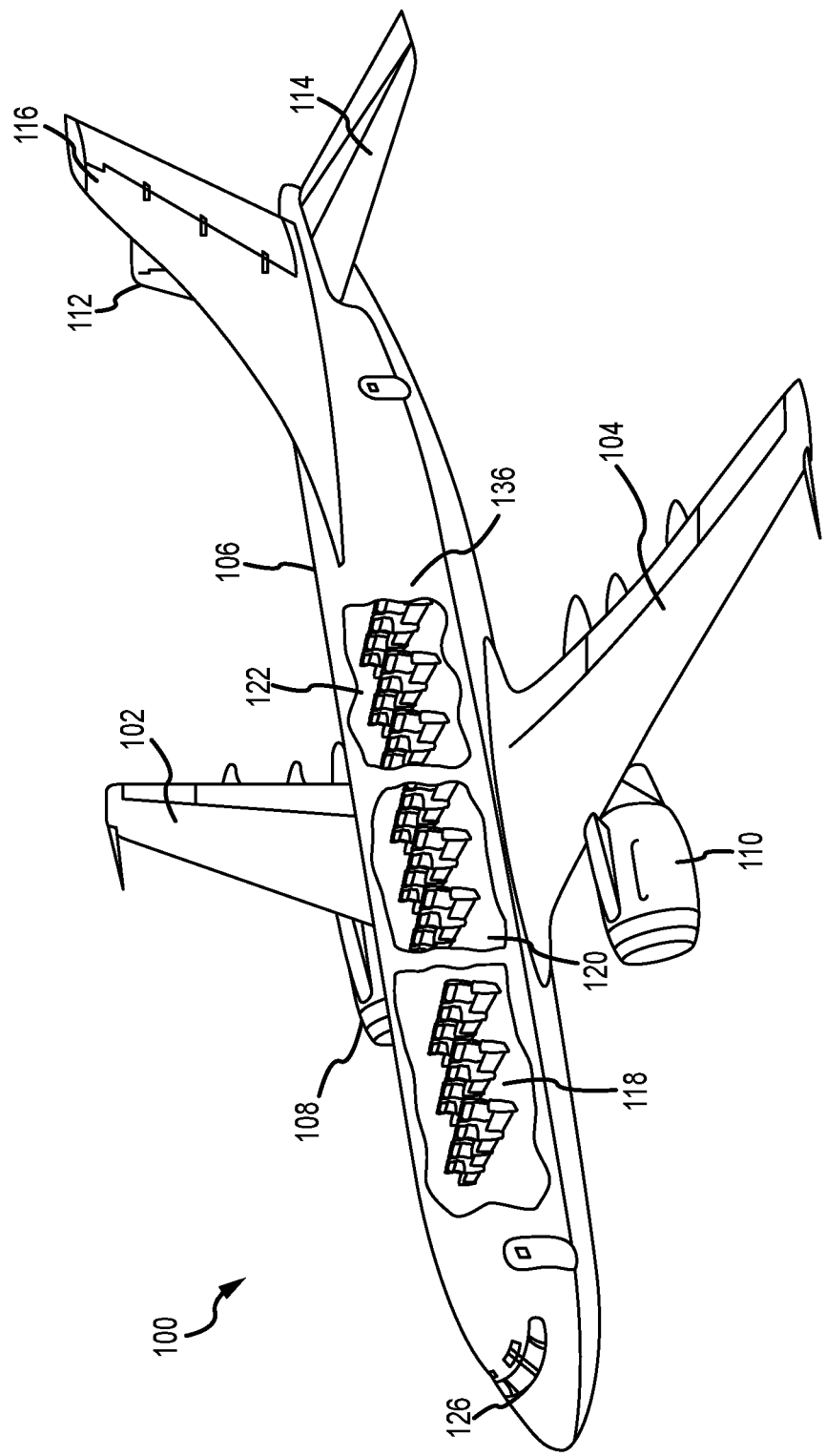
FIG. 1A is a schematic representation of an aircraft amenable to receive various noise attenuation panels, in accordance with various embodiments.
Figure 1C:
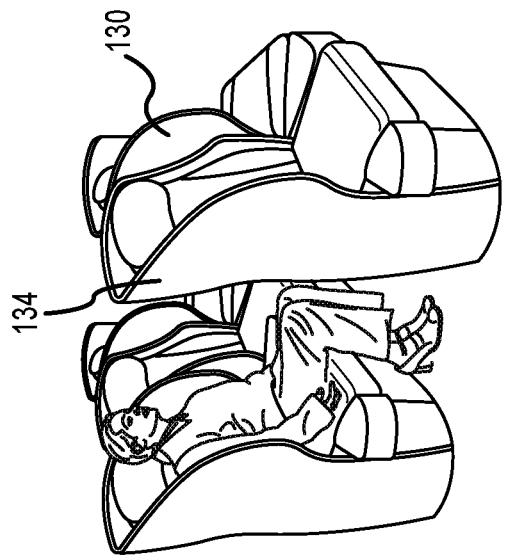
FIGS. 1B, 1C and 1D are schematic representations of various sections within an aircraft or within other structures, such as, for example, homes, offices or other buildings, amenable to receive various noise attenuation panels, in accordance with various embodiments.
Figure 1B:
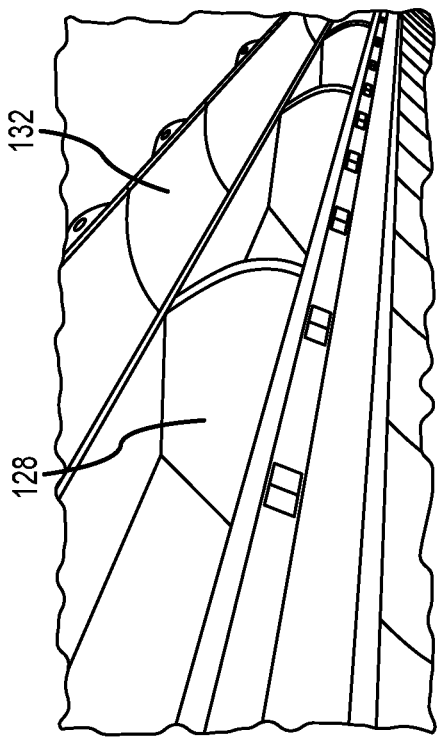
Figure 1D:
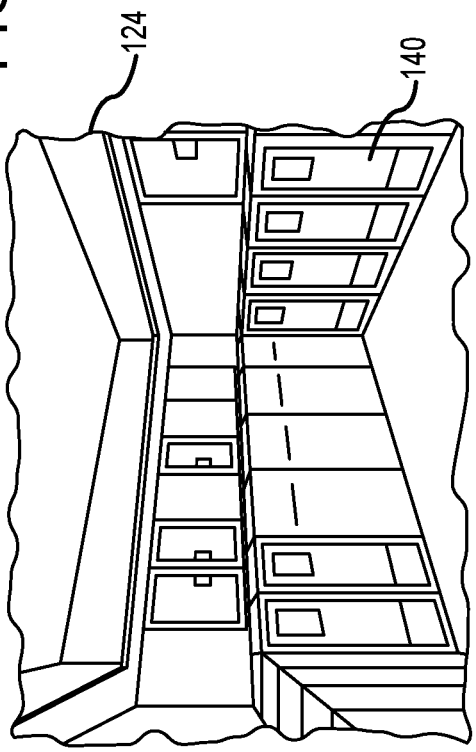

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

With reference now to the drawings and with reference to FIGS. 1A-1D, an illustration of an aircraft 100 and various sections within the aircraft is provided. The aircraft 100 is an example of a passenger or transport vehicle in which noise attenuation systems may be implemented in accordance with various embodiments. In an illustrative embodiment, the aircraft 100 has a starboard wing 102 and a port wing 104 attached to a fuselage 106. The aircraft 100 also includes a starboard engine 108 connected to the starboard wing 102 and a port engine 110 connected to the port wing 104. The aircraft 100 also includes a starboard horizontal stabilizer 112, a port horizontal stabilizer 114 and a vertical stabilizer 116. The aircraft 100 also includes various cabin sections, including, for example, a first cabin section 118, a second cabin section 120 and a third cabin section 122. The aircraft 100 may also include a galley section 124 (see FIG. 1D) and a pilot cabin 126. One or more of the cabin sections includes a passenger baggage compartment 128 (see FIG. 1B) and a passenger seat 130 (see FIG. 1C).

In these illustrative examples, noise attenuation systems, in accordance with various embodiments, may be implemented within or attached to various components of the aircraft 100. For example, in various embodiments, the passenger baggage compartments (e.g., the passenger baggage compartment 128) in one or more of the various cabin sections may include a noise attenuation panel incorporated into one or more of the walls or the doors that form the passenger baggage compartments (e.g., a door 132 of the passenger baggage compartment 128). Similarly, in various embodiments, the passenger seats (e.g., the passenger seat 130) in one or more of the various cabin sections may include a noise attenuation panel incorporated into one or more of the sections that form the passenger seats (e.g., a seat frame 134 of the passenger seat 130). In various embodiments, a noise attenuation panel may be incorporated into one or more of the walls, doors or panels the make up the various cabin sections (e.g., a wall section 136 of the fuselage 106 that surrounds the cabin sections). In various embodiments, a noise attenuation panel may also be incorporated into sound generating equipment, such as, for example, refrigeration equipment 140 (e.g., vapor-compression cycle equipment) located in the galley section 124 or air management systems located throughout the aircraft 100.

Figure 2A:
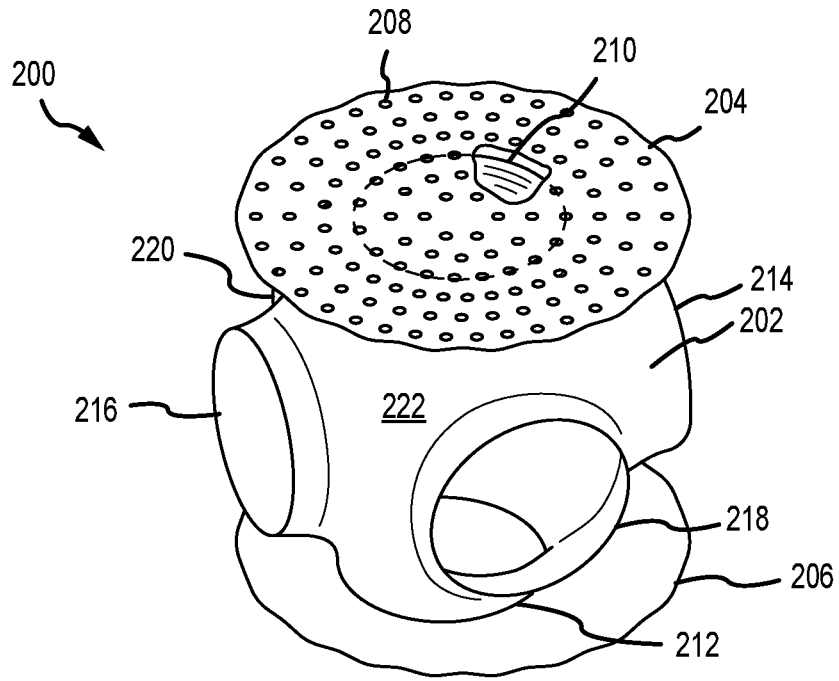
FIGS. 2A and 2B are schematic illustrations of noise attenuation panels for use in an aircraft, other transport vehicle, or within other structures, such as, for example, homes, offices or other buildings, in accordance with various embodiments.
Figure 2B:
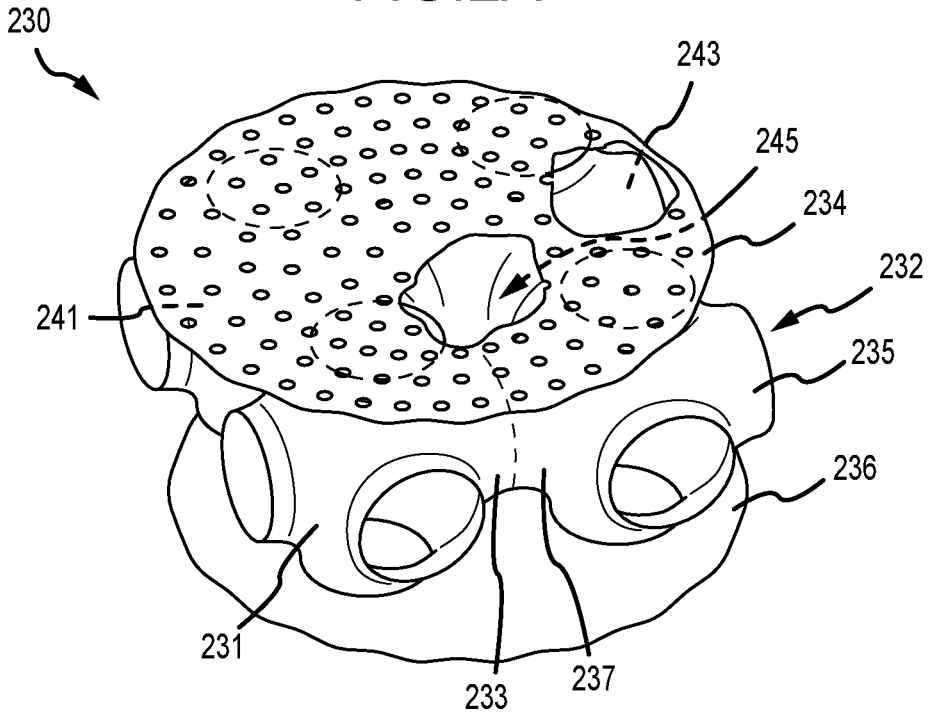

Referring now to FIGS. 2A and 2B, schematic views of a noise attenuation panel (or an acoustic attenuation structure) are provided; the noise attenuation panels described and illustrated in these figures are oversimplified to explain various features of the panels. Referring specifically to FIG. 2A, a noise attenuation panel 200 is illustrated having a unit cell 202 sandwiched between a facesheet 204 and a back plate 206. The facesheet 204 typically includes a plurality of perforations or openings 208 to communicate acoustic waves or energy to the unit cell 202, which acts as a resonator to damp or attenuate the acoustic waves or energy. The back plate 206 typically is non-perforated and, together with the facesheet 204, provides a support structure for the unit cell 202. In various embodiments, and as will be described in further detail below, the unit cell 202 includes a pair of axial tubes, including, for example, a first axial tube 210 connected to the facesheet 204 and a second axial tube 212, opposite the first axial tube 210 (e.g., the first axial tube 210 being axially aligned with the second axial tube 212), connected to the back plate 206. In various embodiments, the unit cell 202 further includes a first pair of lateral tubes, such as, for example, a first lateral tube 214 and a second lateral tube 216, opposite the first lateral tube 214 (e.g., the first lateral tube 214 being axially aligned with the second lateral tube 216). In various embodiments, the unit cell 202 further includes a second pair of lateral tubes, such as, for example, a third lateral tube 218 and a fourth lateral tube 220, opposite the third lateral tube 218 (e.g., the third lateral tube 218 being axially aligned with the fourth lateral tube 220). As also described further below, while the various tubes (or tubular structures) are illustrated in FIG. 2A as having an opening into a central body 222 of the unit cell 202, the various tubes may be connected to the tubes of adjacent unit cells (see, e.g., FIG. 2B) or may be completely or partially closed (or sealed) via a wall or a mesh, which may include a perforated or a similar structure, the wall or the mesh being configured to block or partially restrict, respectively, a flow of fluid therethrough.

Further, it is noted that while the unit cell 202 may comprise a structure that exhibits various degrees of symmetry (e.g., a cubic symmetry typical of a Schwarz P surface), the various tubes or central bodies among a plurality of interconnected unit cells may be sized or shaped identically or exhibit different sizes or shapes among such plurality of interconnected unit cells. Note also that in various embodiments, each of the first axial tube 210, the second axial tube 212, the first lateral tube 214, the second lateral tube 216, the third lateral tube 218 and the fourth lateral tube 220 are in fluid communication with each other via the central body 222.

Referring now to FIG. 2B, with continued reference to FIG. 2A, a noise attenuation panel 230 is illustrated having a plurality of unit cells 232, each having the shape of the unit cell 202, interconnected and sandwiched between a facesheet 234 and a back plate 236. In various embodiments, the plurality of unit cells 232 is formed by interconnecting adjacent lateral tubes of adjacent unit cells together. For example, as illustrated in FIG. 2B, a first unit cell 231 having a first lateral tube 233 may be interconnected to a second unit cell 235 having a second lateral tube 237 by interconnecting the first lateral tube 233 to the second lateral tube 237. In similar fashion, a third unit cell 241 and a fourth unit cell 243 may be interconnected to each other and to, respectively, the first unit cell 231 and to the second unit cell 235. In such fashion, a periodic structure having a plurality of resonators configured to damp or attenuate acoustic waves or energy results. As described in further detail below, note the periodic structure of the plurality of unit cells 232, interconnected as described, results in a hole 245 at the center of the periodic structure and extending axially between the facesheet 234 and the back plate 236. In various embodiments, the hole 245 may be sized to damp or attenuate acoustic waves or energy at different frequencies as do the plurality of unit cells 232.

Figure 3A:
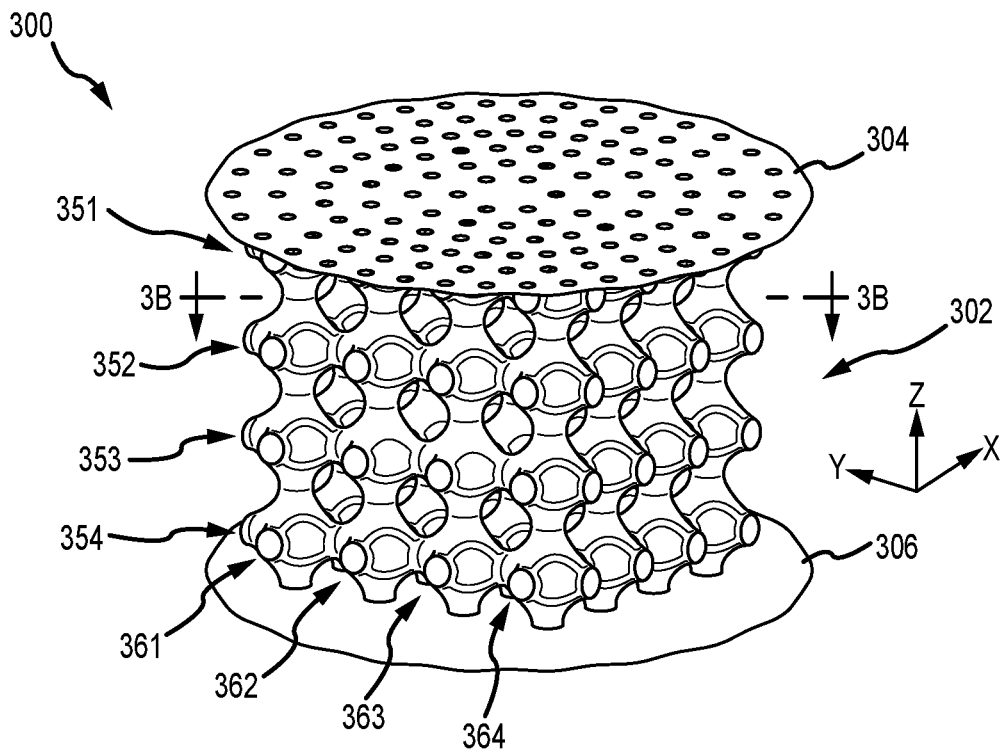
FIGS. 3A and 3B are schematic illustrations of noise attenuation panels for use in an aircraft, other transport vehicle, or within other structures, such as, for example, homes, offices or other buildings, in accordance with various embodiments.
Figure 3B:
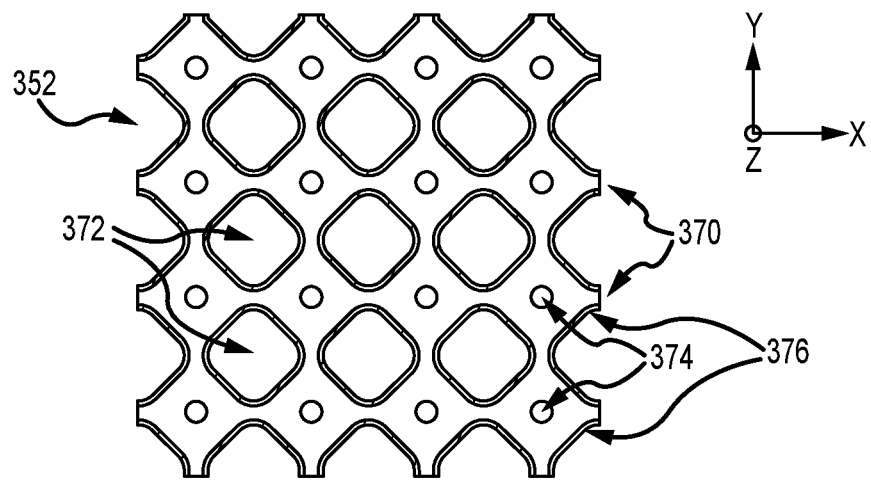

Referring now to FIGS. 3A and 3B, schematic views of a noise attenuation panel 300, similar to the noise attenuation panels described above, are provided. The noise attenuation panel 300 is illustrated as having a plurality of unit cells 302 sandwiched between a facesheet 304 and a back plate 306. The facesheet 304 typically includes a plurality of perforations or openings 308 to communicate acoustic waves or energy to the plurality of unit cells 302, which acts as a resonator to damp or attenuate the acoustic waves or energy. The back plate 306 typically is non-perforated and, together with the facesheet 304, provides a support structure for the plurality of unit cells 302. Each member of the plurality of unit cells 302 has properties and characteristics similar to the unit cell 202 and to the plurality of unit cells 232 described above with reference to FIGS. 2A and 2B, and so such properties and characteristics, including the manner of interconnecting the unit cells within the plurality of unit cells 302 is not repeated here.

One difference between the embodiments described with reference to FIGS. 2A and 2B and those described with reference to FIGS. 3A and 3B is the layered structure exhibited by the noise attenuation panel 300. For example, while the noise attenuation panel 230 described above with reference to FIG. 2B comprises a single layer of unit cells (or a first periodic structure), the noise attenuation panel 300 comprises a plurality of layers of unit cells, including, for example, a first lateral layer of unit cells 351 (or a first periodic structure), a second lateral layer of unit cells 352 (or a second periodic structure), a third lateral layer of unit cells 353 (or a third periodic structure) and a fourth lateral layer of unit cells 354 (or a fourth periodic structure). In various embodiments, each lateral layer of unit cells exhibits an N×M structure of unit cells, where N is the number of unit cells in a first direction (e.g., a first unit cell, a second unit cell . . . an Nth unit cell in the x-direction) and M is the number of unit cells in a second direction (e.g., a first unit cell, a second unit cell . . . an Mth unit cell in the y-direction). A similar arrangement applies to the layers of unit cells in the axial or the z-direction, which may be P in number, and include a first axial layer of unit cells 361 (or a first periodic structure), a second axial layer of unit cells 362 (or a second periodic structure), a third axial layer of unit cells 363 (or a third periodic structure) and a fourth axial layer of unit cells 364 (or a fourth periodic structure). Note that while each of M, N and P equals four (4) in FIGS. 3A and 3B, there is no requirement that M, N and P equal one another in any particular noise attenuation panel or embodiment thereof.

With primary reference now to FIG. 3B, and with continued reference to FIG. 3A, the second lateral layer of unit cells 352 is illustrated from an overhead (or axial or z-direction) perspective. Given the generally periodic structure of the noise attenuation panel 300, the second lateral layer of unit cells 352 may be considered representative of any of the lateral or axial layers of unit cells identified above. The layer of unit cells comprises an N×M plurality of unit cells 370 interconnected together (via a plurality of lateral tubes as described above) and an (N−1)×(M−1) plurality of holes 372 disposed between the unit cells. The layer also comprises an N×M plurality of axial tubes 374 that extend into an N×M plurality of central bodies 376 of the unit cells (e.g., a first central body, a second central body . . . an N×Mth central body). As discussed further below, one or more of the individual members of the (N−1)×(M−1) plurality of holes 372, the N×M plurality of axial tubes 374 and the plurality of lateral tubes may be either completely or partially sealed or restricted to tune the noise attenuation panel 300 to attenuate various frequencies of the acoustic energy spectrum that the noise attenuation panel 300 is being subjected during operation.

Referring now to FIGS. 4A and 4B, sectional schematic views of a portion of a noise attenuation panel 400, similar to any of the noise attenuation panels described above, are provided. Referring to FIG. 4A, for example, a schematic view of a hole 445, similar to the hole 245 illustrated in FIG. 2B or one of the (N−1)×(M−1) plurality of holes 372 illustrated in FIG. 3B, is provided. As described above, the hole 445 is defined by a plurality of unit cells 402 that are interconnected via the interconnecting of lateral or axial tubes associated with the plurality of unit cells 402. As illustrated, the hole 445 is partially restricted via a hole mesh 447 throughout space that is configured to act as a bulk absorber to reduce or restrict the flow of air through the hole 445. Note that in various embodiments, the hole mesh 447 may comprise a plurality of layers of mesh-like materials, perforated structures or even acoustic foams so the resulting structure exhibits properties of a bulk material or a foam that either partially restricts of completely restricts the flow of air (or acoustic waves) within the space that is exterior to the plurality of unit cells 402. The partial or complete restriction provided by the hole mesh 447 facilitates additional tuning of the noise attenuation panel 400 to attenuate over a broader frequency range of the acoustic energy spectrum. Similarly, referring to FIG. 4B, a schematic view of an isolated one of the plurality of unit cells 402, similar to one of the plurality of unit cells 232 illustrated in FIG. 2B or one of the plurality of unit cells 302 illustrated in FIG. 3A, is provided. As described above, the isolated one of the plurality of unit cells 402 includes a tube 403, either lateral or axial, depending on the orientation of the unit cell. As illustrated, the tube 403 is partially restricted via a tube mesh 449, which may include properties similar to those identified for the hole mesh 447, that is configured to reduce or restrict the flow of air through the tube 403. The partial restriction provided by the tube mesh 449 facilitates tuning the noise attenuation panel 400 to attenuate specific frequencies of the acoustic energy spectrum the noise attenuation panel 400 is being subjected during operation.

Referring now to FIGS. 5A and 5B, a model 501 that facilitates mathematical design of a noise attenuation panel 500 is described. As illustrated, the model 501 approximates the behavior or response of the noise attenuation panel 500 via a dynamical system that includes (i) a mass (e.g., M1 and M2) that represents the mass of air associated with an acoustic wave 503 that oscillates within a tube of a unit cell; (ii) a stiffness (e.g., K1 and K2) that represents the density of the air within the central body of the unit cell; and (iii) a dashpot (e.g., R1 and R2) that represents the energy dissipation associated with the air moving in the tubes. The dynamical system facilitates development of a set of differential equations that may be solved to approximate the behavior or response of the noise attenuation panel 500. The dynamical system may also account for complete or partial restriction of the various axial or lateral tubes associated with the unit cell. While the model 501 illustrated in FIG. 5B is representative of a simple two unit-cell system as illustrated in FIG. 5A, such models may be extended to arbitrarily large numbers of unit cells.

Figure 6A:
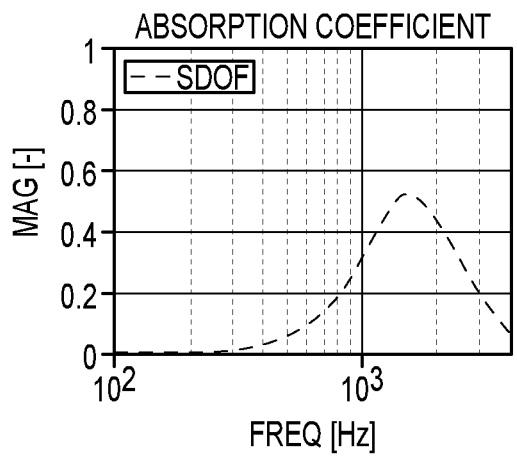
FIGS. 6A, 6B, 6C and 6D are schematic views of the noise attenuation panels of the present disclosure and performance graphs illustrating improvements over more conventional single-degree of freedom cell-based structures, in accordance with various embodiments.
Figure 6C:
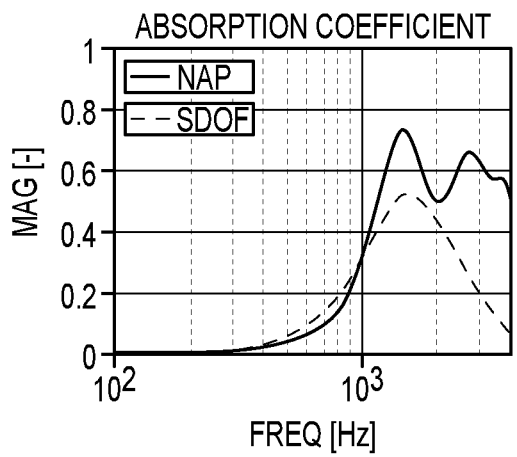
Figure 6B:
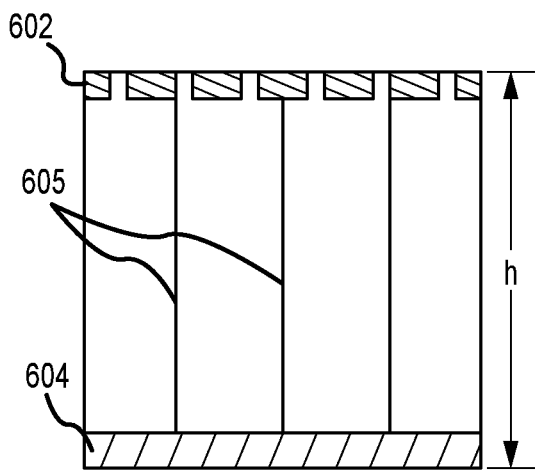
Figure 6D:
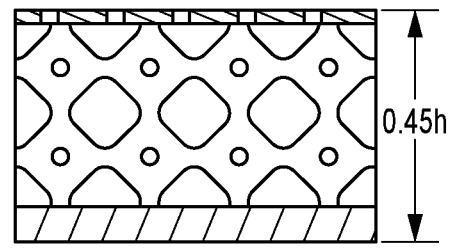

Referring now to FIGS. 6A, 6B, 6C and 6D, computational results are provided that illustrate various benefits of the noise attenuation panels presented and described in this disclosure. Referring to FIGS. 6A and 6B, a graph 681 showing absorption coefficient as a function of frequency is illustrated for a conventional single degree of freedom noise attenuation panel 680 (SDOF) having a facesheet 602 and a back plate 604 defining a height (h) of the panel, filled with a honeycomb structure 605. By way of comparison, FIGS. 6C and 6D illustrate a graph 683 showing absorption coefficient as a function of frequency for a noise attenuation panel 682 (NAP) having the same facesheet and a back plate as employed in the conventional single degree of freedom noise attenuation panel 680. As indicated in the graph 683, the noise attenuation panel 682 provides a greater magnitude of noise attenuation at the design frequency and an extended attenuation bandwidth with more broadband absorption at higher frequencies, than the conventional single degree of freedom noise attenuation panel 680 having a height (h) less than 50% of the height (h) of the conventional panel, thus providing a substantial space and potential weight savings and an increase in attenuation of noise over the conventional panel.

Figure 7A:
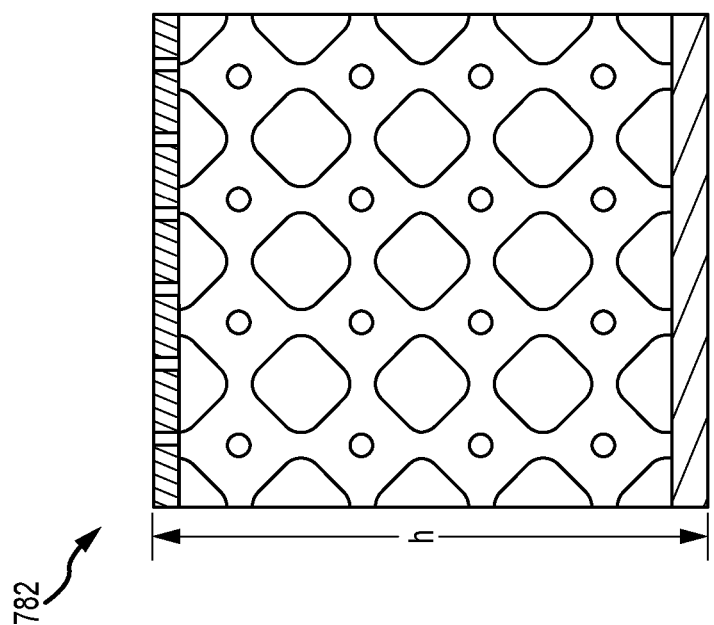
FIGS. 7A and 7B are schematic views of a noise attenuation panel of the present disclosure and a performance graph illustrating improvements over conventional single-degree of freedom cell-based structures, in accordance with various embodiments.
Figure 7B:
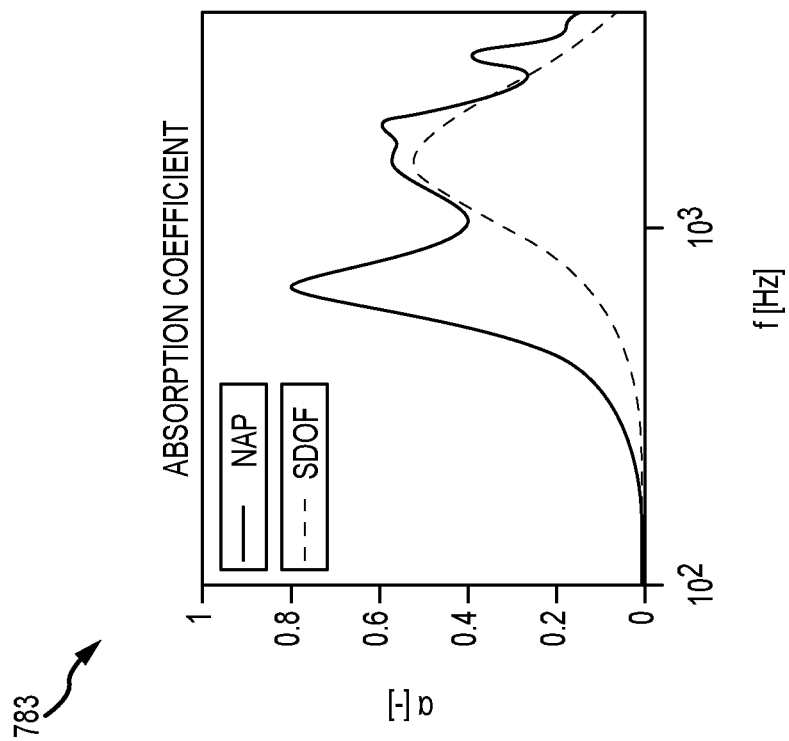

Referring now to FIGS. 7A and 7B, schematic views of a noise attenuation panel of the present disclosure and a performance graph illustrating improvements over more conventional single-degree of freedom cell-based structures are provided, in accordance with various embodiments. Referring to FIG. 7A, a noise attenuation panel 782, similar to the noise attenuation panel 682 described above, is depicted. Rather than having a height (h) equal to 0.45 h of the height (h) of the conventional single degree of freedom noise attenuation panel 680, also described above, the noise attenuation panel 782 has a height (h) equal to the height (h) of the conventional single degree of freedom noise attenuation panel 680. This enables a more direct comparison between the noise attenuation panel 782 and the conventional single degree of freedom noise attenuation panel 680 when constructed to have the same dimension (e.g., the same height (h)). As illustrated in FIG. 7B, for example, a graph 783 showing absorption coefficient as a function of frequency for the noise attenuation panel 782 (NAP) and the conventional single degree of freedom noise attenuation panel 680 (SDOF) is provided. As indicated in the graph 783, the noise attenuation panel 782 provides a greater magnitude of noise attenuation at the design frequency and at both higher and lower frequencies surrounding the design frequency than the conventional single degree of freedom noise attenuation panel 680, thus providing an extended attenuation bandwidth with more broadband absorption at both higher and lower frequencies than the design frequency where the two noise attenuation panels share the same dimensional characteristics.

Figures 8A, 8B:
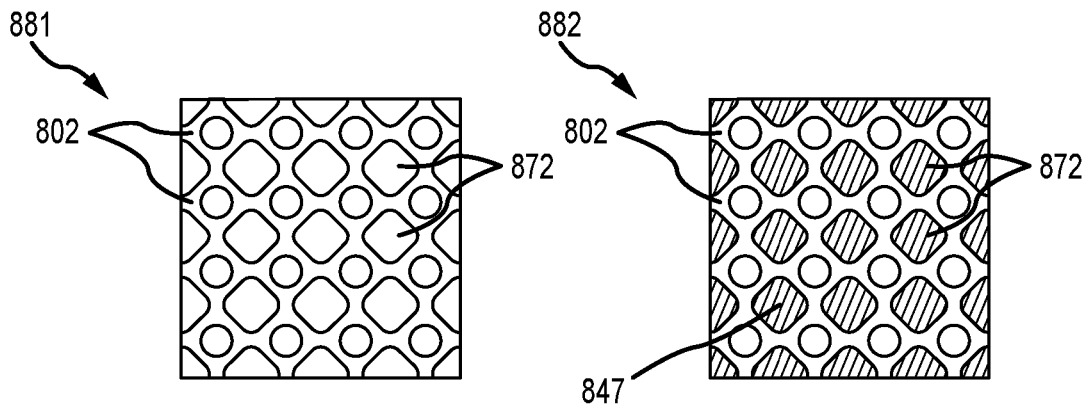
FIGS. 8A, 8B and 8C are schematic views of various embodiments of the noise attenuation panels of the present disclosure illustrating relative performance, in accordance with various embodiments.
Figure 8C:
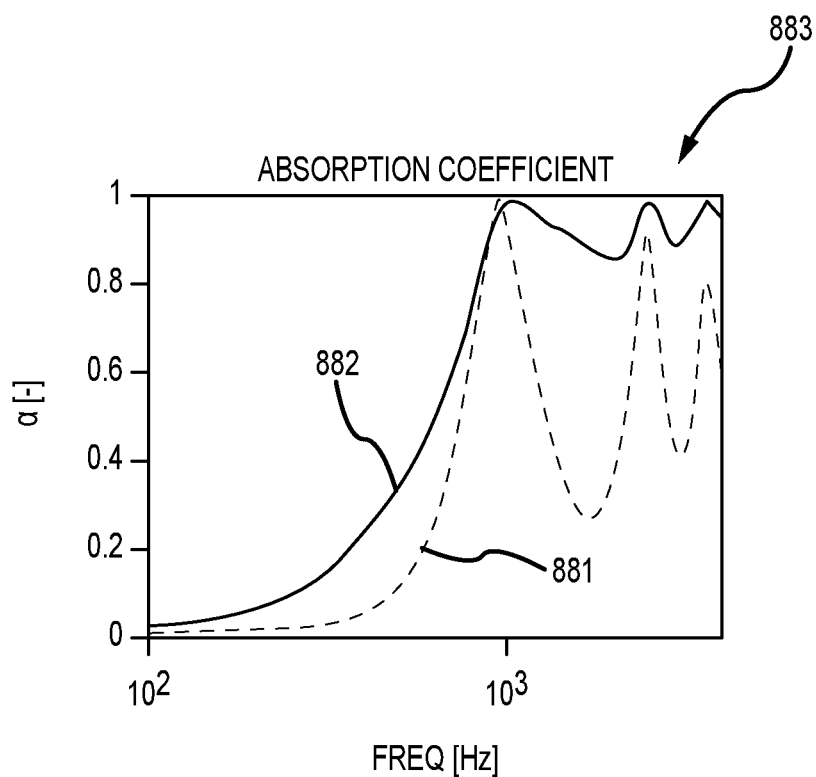

Referring now to FIGS. 8A, 8B and 8C, schematic views of various embodiments of the noise attenuation panels of the present disclosure, and a graph illustrating relative performance, are provided. Referring to FIGS. 8A and 8B, a first noise attenuation panel 881 and a second noise attenuation panel 882 are illustrated. Similar to the various embodiments above described, both the first noise attenuation panel 881 and the second noise attenuation panel 882 include a plurality of unit cells 802 and a plurality of holes 872 defined by the spaces in between the individual unit cells comprising the plurality of unit cells 802. The only difference between the first noise attenuation panel 881 and the second noise attenuation panel 882 is each of the plurality of holes 872 in the second noise attenuation panel 882 is partially restricted or completely restricted via a hole mesh 847, similar to the hole mesh 447 described above. Note that where complete restriction is provided, the hole mesh 847 may be completely solid—e.g., the space exterior to the plurality of unit cells 802 is completely filled with material. Referring now to FIG. 8C, a graph 883 showing absorption coefficient as a function of frequency for the first noise attenuation panel 881 and the second noise attenuation panel 882 is provided. As depicted in the graph 883, the second noise attenuation panel 882 exhibits an extended attenuation bandwidth with greater broadband absorption throughout the range of frequencies, which illustrates the enhanced noise absorption characteristics provided by the hole mesh 847 used to partially restrict the flow of air through each of the plurality of holes 872.

Referring now to FIGS. 9A, 9B and 9C, schematic illustrations of a noise attenuation panel 900 are provided, in accordance with various embodiments. Similar to the various embodiments described above, the noise attenuation panel 900 includes a plurality of unit cells 902 sandwiched between a facesheet 904 and a back plate 906. The facesheet 904 typically includes a plurality of perforations or openings 908 to communicate acoustic waves or energy to the plurality of unit cells 902. Each member of the plurality of unit cells 902 has properties and characteristics similar to the unit cell 202 and to the plurality of unit cells 232 described above with reference to FIGS. 2A and 2B, and so such properties and characteristics, including the manner of interconnecting the unit cells within the plurality of unit cells 902 is not repeated here. In various embodiments, the noise attenuation panel 900 includes a gap 909 adjacent the back plate 906 at each of the unit cells positioned adjacent the back plate 906, where the gap 909 provides an opening or spacing away from the back plate 906, thereby allowing fluid communication between the interior of the unit cells positioned adjacent the back plate 906 and the exterior of the unit cells comprising the plurality of unit cells 902.

Referring more particularly now to FIGS. 9B and 9C, and with continued reference to FIG. 9A, a panel section 920 of the noise attenuation panel 900 is illustrated as comprising a single row of unit cells sandwiched between the facesheet 904 and the back plate 906. As illustrated, during operation, acoustic waves or energy impinge upon the facesheet 904 and enter the first unit cell of the panel section 920 via a perforation 903 (or via a plurality of such perforations). The acoustic waves or energy then traverse the plurality of unit cells 902 where acoustic attenuation occurs as described above. In various embodiments, the acoustic waves or energy then exit the interiors of the plurality of unit cells at the gap 909 adjacent the back plate 906. Once exited, the acoustic waves or energy then traverse back to the facesheet 904 via a plurality of holes 972 defined by the spaces in between the individual unit cells comprising the plurality of unit cells 902. The acoustic waves or energy then may exit the facesheet 904 via the plurality of perforations or openings 908. Note that in various embodiments, one or more or even all of the plurality of perforations or openings 908 may be closed to alter the frequency range of attenuation. In the case where all of the plurality of perforations or openings 908 is completely closed or sealed, it is possible to shift the peak absorption frequency to a lower frequency range than would otherwise occur. In such case, the volume of space exterior to the plurality of unit cells 902—i.e., the plurality of holes 972—acts as a closed volume or resonator.

Figure 10A:
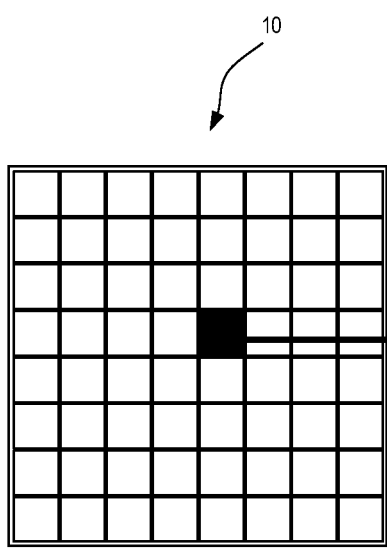
FIG. 10A is a schematic view of an acoustic panel comprising a plurality of noise attenuation supercells, in accordance with various embodiments.

Referring to FIG. 10A, an acoustic panel 10 is shown in accordance with various embodiments. In various embodiments, the acoustic panel 10 may comprise at least one supercell 20, shown in FIG. 10B. In various embodiments, the acoustic supercell 20 may comprise a cell wall 22. In various embodiments, the acoustic supercell 20 may comprise a plurality of cell walls. In various embodiments, the acoustic supercell 20 may comprise a facesheet 24 having a plurality of perforations 26.

In various embodiments, the acoustic supercell 20 may comprise a back plate 28. The back plate 28 may be parallel to the facesheet 24. In various embodiments, the cell wall 22 may contact the facesheet 24 and the back plate 28. In various embodiments, the cell wall 22 may be substantially orthogonal to the facesheet 24 and the back plate 28. For example, the cell wall 22 may be oriented at a 90-degree angle to the facesheet 24 and the back plate 28. In various embodiments, the cell wall may be oriented at an angle between 10-45 degrees, 45-120 degrees, and 120-170 degrees, relative the facesheet 24 and the back plate 28.

In various embodiments, the acoustic supercell 20 may comprise periodic structures 30, previously described as any of the periodic structures (351, 352, 353, 354) of the plurality of unit cells (232/302) of FIGS. 2A-2B, and FIGS. 3A-3B. Each member of the plurality of unit cells has properties and characteristics similar to the unit cell and to the plurality of unit cells described above with reference to FIGS. 2A-2B and 3A-3B, and so such properties and characteristics, including the manner of interconnecting the unit cells within the plurality of unit cells is not repeated here.

Figure 10B:
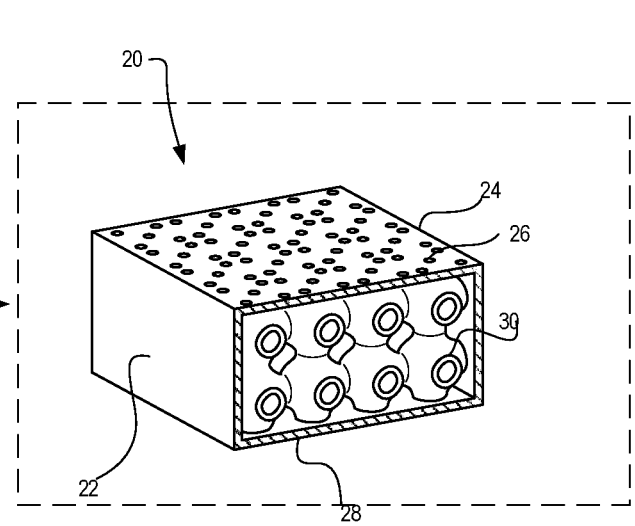
FIG. 10B is a schematic view of a noise attenuation supercell of the acoustic panel of FIG. 10A, in accordance with various embodiments.

As shown in FIG. 10B, in various embodiments, the facesheet 24, the back plate 28, and the cell wall 22 may be in fluid communication with the periodic structures 30, wherein the facesheet 24, the back plate 28, and the cell wall 22 may enclose the periodic structures 30. The facesheet 24 typically includes a plurality of perforations 26 or openings to communicate acoustic waves or energy to the plurality of unit cells, which acts as a resonator to damp or attenuate the acoustic waves or energy. The face sheet 24 may assist in the absorption of acoustic waves or energy. During operation, acoustic waves or energy impinge upon the facesheet 24 and enter the periodic structure 30 via a perforation 26 (or via a plurality of such perforations). The acoustic waves or energy then traverse the plurality of unit cells (periodic structure 30) where acoustic attenuation occurs as described above.

In various embodiments, the acoustic waves or energy may reflect off the back plate 28, traverse the plurality of holes defined by the spaces in between the individual unit cells comprising the plurality of unit cells, and exit the interiors of the plurality of unit cells (periodic structure 30). Once exited, the acoustic waves or energy then traverse back to the facesheet 24 via the previously described plurality of holes defined by the spaces in between the individual unit cells comprising the plurality of unit cells. The acoustic waves or energy then may exit the facesheet 24 via the plurality of perforations 26 or openings. Note that in various embodiments, one or more or even all of the plurality of perforations 26 or openings may be closed to alter the frequency range of attenuation. The back plate 28, in various embodiments, is non-perforated and, together with the facesheet 24, provides a support structure for the plurality of unit cells (periodic structure 30).

As shown in FIG. 11A, in various embodiments, the acoustic panel 10 may comprise a first supercell 11 tuned to a first frequency. In various embodiments, the acoustic panel 10 may comprise a second supercell 12 tuned to a second frequency. For example, as shown in FIGS. 11B (first supercell 11) and 11C (second supercell 12), the variations between each supercell may be variations in the periodic structures of the supercells.

The first supercell 11 may comprise a variety of layers of unit cells (periodic structure 30), comprising any number of unit cells, and comprising various lateral and axial tubes diameters custom-tailored for a particular acoustic wavelength absorption (absorption target). Similarly, the second supercell 12, which in this example is located at a region of the acoustic panel 10 distal to that of the first supercell 11, may be custom-tailored to include an alternative number of unit cell layers, unit cells, and various lateral and axial tube diameters. The supercells may thus be of differing depths (i.e. two-layer depths versus three-layer depths) and may comprise tailored unit cell layers to meet various acoustic absorption targets (i.e., frequencies). Moreover, in various embodiments, the supercell facesheets 24 may be tailored to a variety of acoustic frequencies by altering the number of perforations 26 of the facesheet 24. Accordingly, a single acoustic panel 10 may comprise any number of super cells tuned to a variety of acoustic frequencies and acoustic absorption targets. For example, acoustic panels disposed in cargo paneling may be tuned to a set of frequencies that differ from that of acoustic panels disposed proximate passenger seating.

A benefit of an acoustic panel comprising a plurality of individually tuned supercells is that the supercells may be spatially separated and tuned individually. Accordingly, the supercells enable spatial separation of individually tuned periodic structures localized for every area of an aircraft. For example, supercells of an acoustic panel that are in passenger areas proximate the gas turbine engines may have acoustic absorption targets that differ from supercells in other passenger areas, since each area is associated with different frequencies that may benefit from attenuation. Accordingly, the passenger compartment of an aircraft may be designed to be a continuous structure with individually localized acoustic components enabled by the supercells.

Figure 12A:
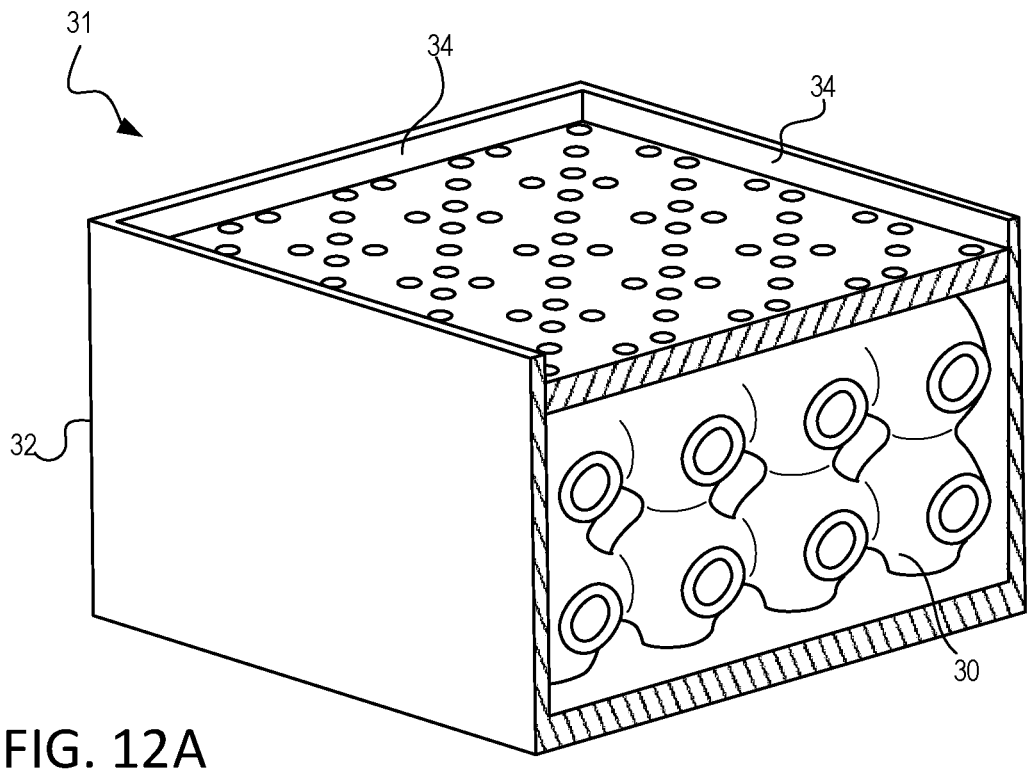
FIGS. 12A and 12B are schematic views of a noise attenuation supercell comprising a porous facesheet and a backplate, in accordance with various embodiments.
Figure 12B:
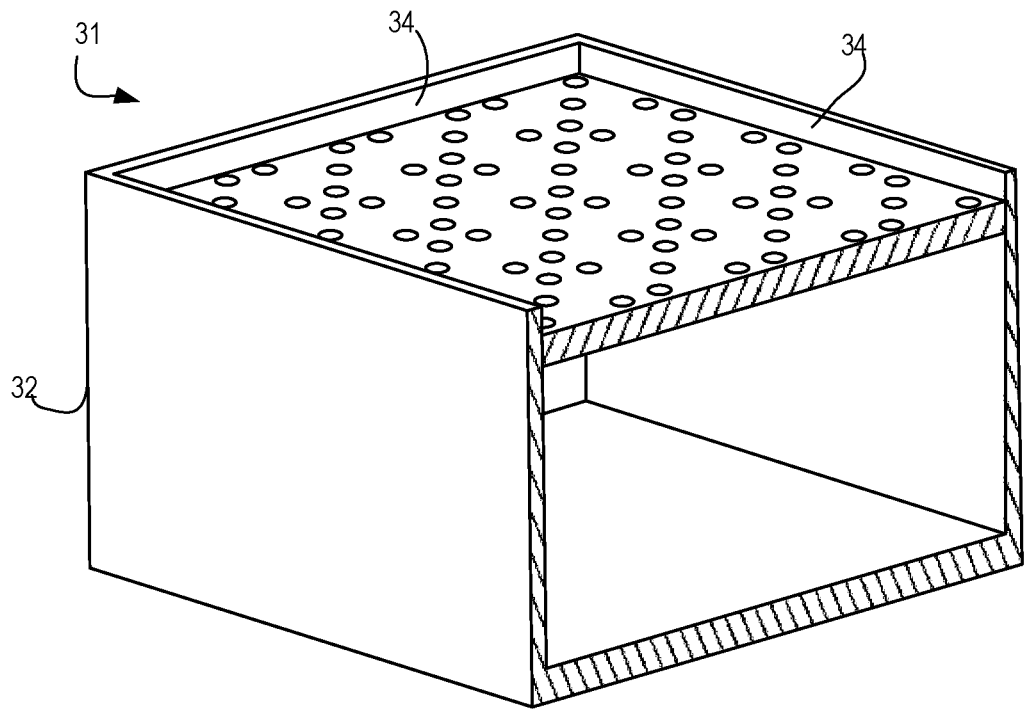
Figure 13A:
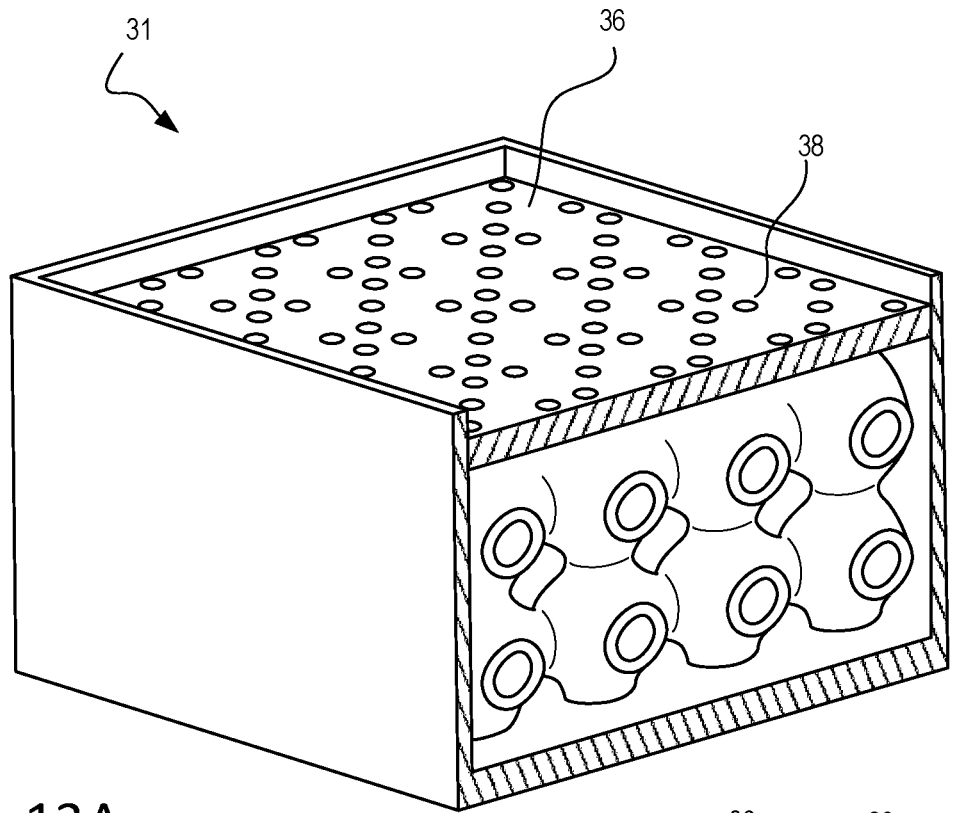
FIGS. 13A and 13B are schematic views of a noise attenuation supercell comprising a porous facesheet and a backplate, in accordance with various embodiments.
Figure 13B:
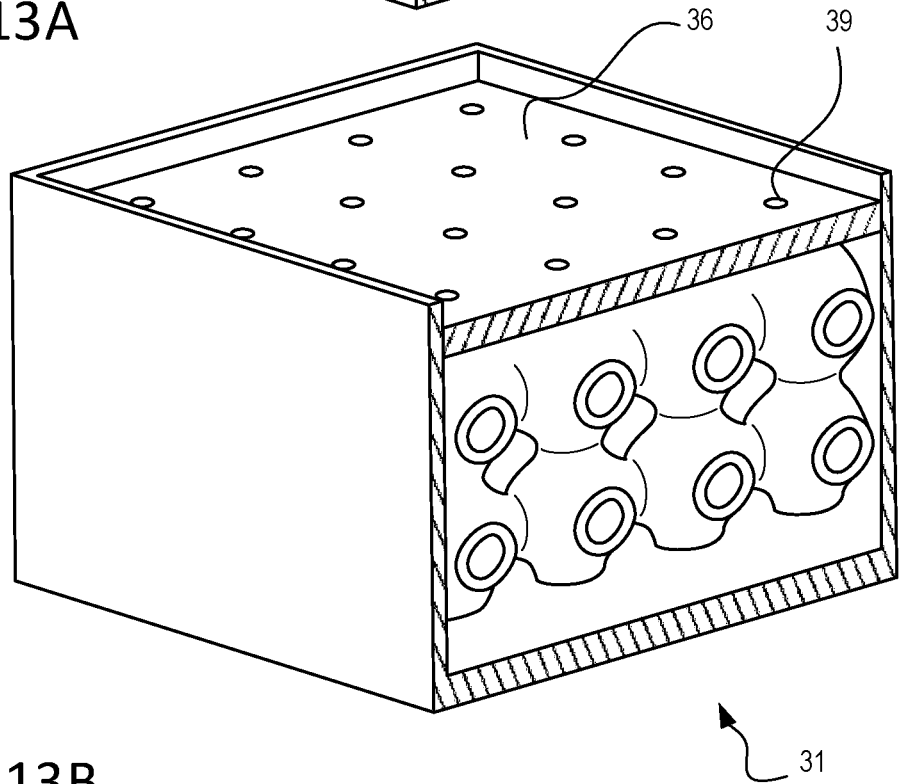

As shown in FIGS. 12A and 12B, an acoustic supercell 31 may comprise a cell wall 32. The cell wall 32 may further comprise an outer facesheet wall portion 34. In various embodiments, the cell wall 32 may define a continuous outer facesheet wall portion. In various embodiments, the cell wall may comprise a detachable (i.e. segmented and/or modular) outer facesheet wall portion. In various embodiments, the acoustic supercell 31 may comprise a plurality of cell wall. Moreover, as shown in FIG. 12B, the acoustic supercell 31 may be designed to enable removal of the periodic structure 30 for alterations, repair, and/or tuning. As additionally shown in FIGS. 13A and 13B, in various embodiments, the acoustic supercell 31 may comprise an inner facesheet 36 having a plurality of perforation configurations (38 and 39).

Figure 14:
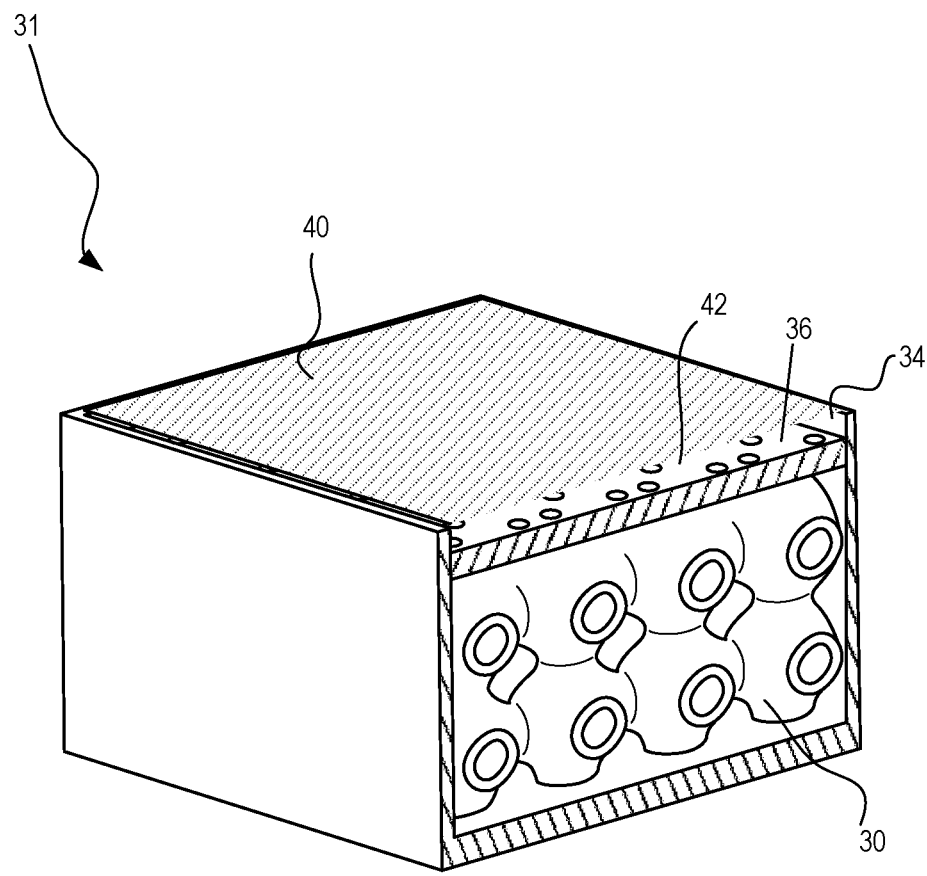
FIG. 14 is a schematic view of a noise attenuation supercell having an outer facesheet, in accordance with various embodiments.

As shown in FIG. 14, in various embodiments, the acoustic supercell 31 may comprise an outer facesheet 40, wherein the outer facesheet 40, the inner facesheet 36, and the outer facesheet wall portion 34 define an airgap 42. For supercells in an aircraft interior (for example, passenger seating area), it may be advantageous to utilize a supercell having the outer facesheet 40 to prevent clogging of the inner facesheet perforations. Clogging may be caused by dust, passenger particulates, microorganisms, as well as any other like obstructions. Accordingly, in various embodiments, the outer facesheet 40 may be a non-permeable membrane (i.e. impermeable to liquids and solids). In various embodiments, the outer facesheet 40 may be a microporous membrane.

In various embodiments, a nonporous membrane material may comprise phenolic, fiberglass reinforced plastic, aramid sheet, high-strength polyvinylidene difluoride (PVDF) film, fluorinated ethylene propylene (FEP) film, or PVDF film, and the like. In various embodiments, a microporous membrane may comprise polyethylene, woven aramid fibers, or faux leather fabric, and the like.

The outer facesheet 40 may be configured for interior supercells based on considerations of maintenance, cleanliness, aesthetics, and acoustic transparency. It may be advantageous to select an outer facesheet 40 that permits acoustic waves to traverse the outer facesheet 40 and be absorbed by the periodic structure 30. In other words, it may be advantageous for the outer facesheet 40 to be substantially acoustically transparent, allowing the majority of acoustic waves to pass therethrough and enable the periodic structure 30 itself to perform acoustic attenuation. A non-acoustically transparent, thick, or thicker outer facesheet membrane may tend to reflect acoustic waves away from the periodic structure of the supercells. Accordingly, membrane material type, thickness, and the size of the supercell are parameters that may be selected for the facesheet to work efficiently with the underlying periodic structure and enable high acoustic absorption. Moreover, the airgap 42 may prevent the outer facesheet 40 from impinging acoustic communication to the inner facesheet 36.

Figure 15:
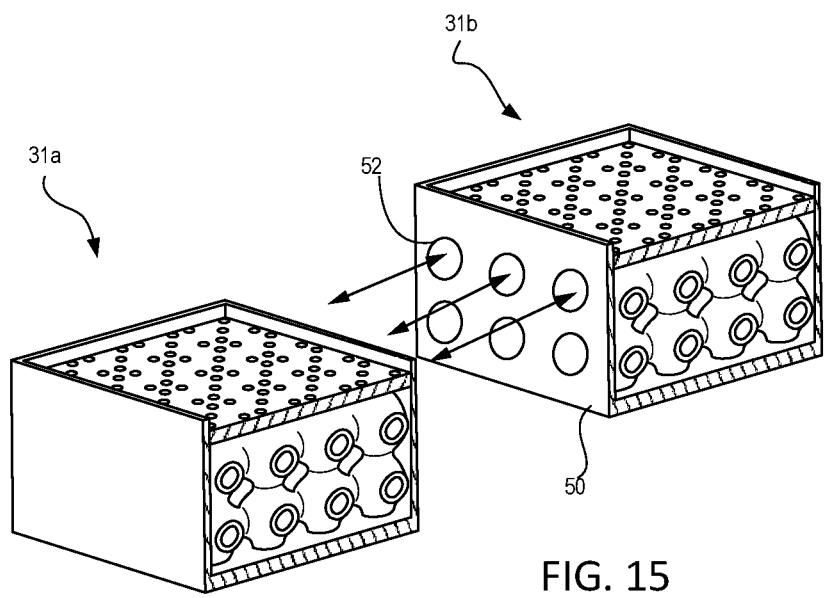
FIGS. 15 and 16 are schematic views of noise attenuation supercells having lateral cell wall apertures and windows, in accordance with various embodiments.
Figure 16:
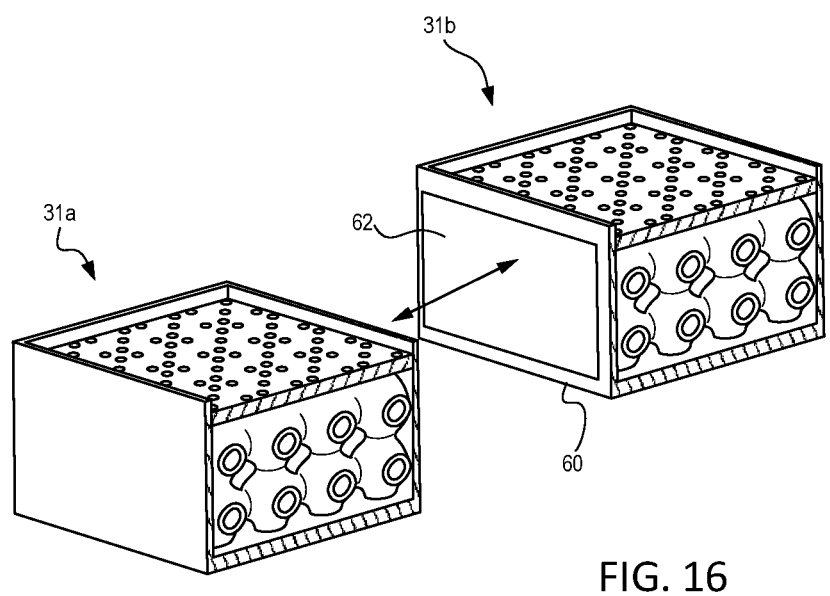

Referring to FIG. 15, in various embodiments, the cell wall 50 may define a plurality of apertures 52. As previously discussed, each supercell 31a and 31b may be locally tuned. Accordingly, each supercell may comprise cell walls that are solid. In various embodiments, it may be advantageous to connect or group two or more supercells and tune the grouped supercells. Porous or perforated cell walls 50 may enable lateral acoustic communication through the apertures 52 (sidewall openings) and through an acoustic panel. In various embodiments, and as shown in FIG. 16, a cell wall 60 may comprise an open sidewall window 62, enabling greater acoustic communication between supercells 31a and 31b relative to supercell configurations having either perforated cell walls or solid cell walls. Acoustic panels having supercells that may be separate or connected allows the supercells to have additional degrees of freedom with respect to acoustic performance.

Figure 17:
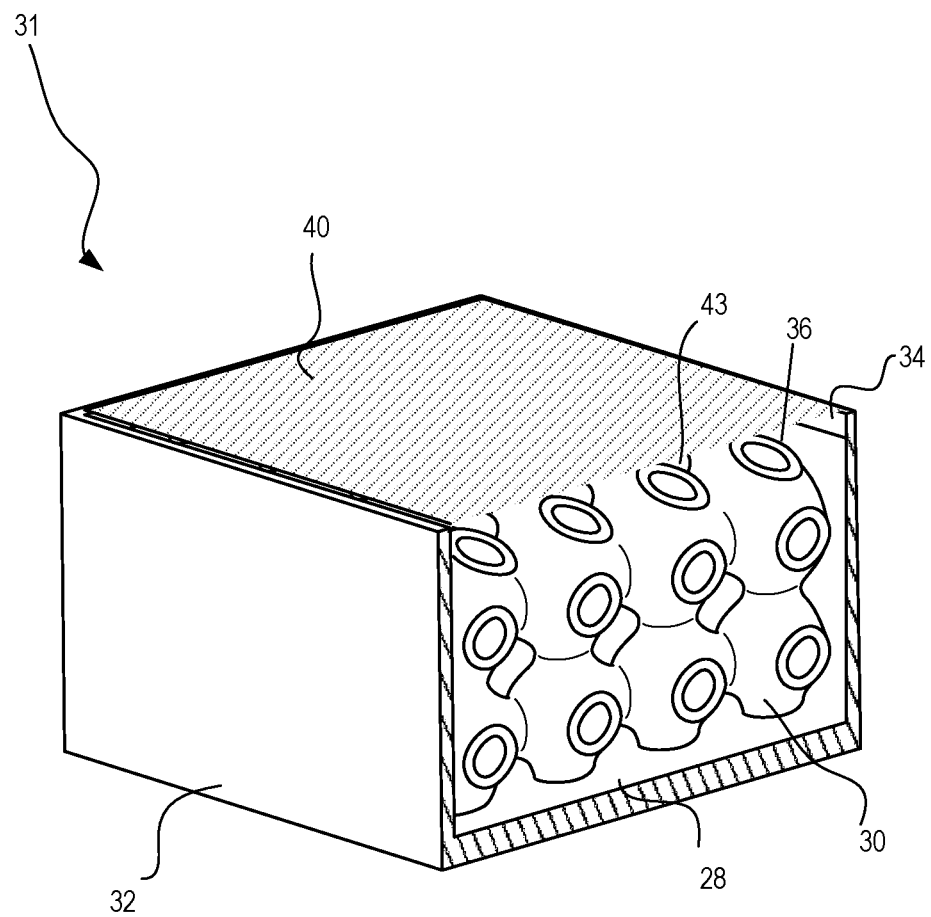
FIG. 17 is a schematic view of a noise attenuation supercell having an outer facesheet, in accordance with various embodiments.

Referring to FIG. 17, in various embodiments, the acoustic supercell 31 may comprise the outer facesheet 40 parallel to the first periodic structure 30. The outer facesheet 40, the first periodic structure 30, and the outer facesheet wall portion 34 may define an airgap 43. The outer facesheet 40, the back plate 28, and the cell wall 32 may be configured to enclose the first periodic structure 30.

The foregoing disclosure provides an acoustic metamaterial (e.g., a material engineered to have a property or properties not found in naturally occurring materials) consisting of a periodic lattice structure made of a unit cell bulb-like structure that divides a space into two or more separated but intertwined fluid networks (e.g., the holes and the tubes described above). The fluid networks are locally coupled at the junctions of the lattice structure to create arrays of resonator networks. The resonator networks may be varied in length, width or height to satisfy particular target frequencies for maximum sound absorption or attenuation. Distributed networks of various dimensions may be constructed for broadband absorption. Hybrid concepts include various forms of restrictions or space fillers for tuning the resulting noise attenuation panel. These spacefillers can act as bulk absorbers to extend the bandwidth and frequency range of acoustic attenuation or they can be partially or completely solid (or filled) for improved structural performance. Further, the unit cells may be of constructed of different forms, sizes or shapes or may have similar, repeating shapes of the same size, such as, for example, including the Schwarz P periodic minimal surface. Advantageously, the various resonator networks, including networks exhibiting repeating and identically shaped unit cells, or networks exhibiting non-repeating and non-identically shaped unit cells, or networks comprising various restrictions (complete or partial) distributed throughout various of the tubes or holes described above, may be fabricated using additive manufacturing techniques and dynamically modeled via acoustic performance analysis prior to manufacture. Other benefits of the disclosure include noise attenuation panels exhibiting greater damping or attenuation per unit volume as compared to conventional honeycomb liners. This benefit translates into potential weight reduction or fuel savings over existing technology. The noise attenuation panels described herein also provides an ability to replace conventional structural honeycomb liners with liners having better attenuation and structural properties.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

We claim:

1. An acoustic panel comprising:
   a first set of supercells, each of the first set of supercells configured for acoustic absorption;
   a supercell surrounded by the first set of supercells in a first position within the acoustic panel, the supercell including:
   a facesheet having a plurality of perforations;
   a back plate parallel to the facesheet;
   a cell wall contacting the facesheet and the back plate, wherein the cell wall is substantially orthogonal to the facesheet and the back plate; and
   a periodic structure having a first unit cell, the first unit cell having a first central body and a first axial tube disposed on the first central body and a second axial tube disposed on the first central body, opposite the first axial tube, each of the first axial tube and the second axial tube being in fluid communication with one another through the first central body,
   wherein the facesheet, the back plate, and the cell wall are in fluid communication with the periodic structure, wherein the facesheet, the back plate, and the cell wall are configured to enclose the periodic structure.

2. The acoustic panel of claim 1, wherein the first unit cell includes a first lateral tube, disposed on and in fluid communication with the first central body, and a second lateral tube, opposite the first lateral tube and disposed on and in fluid communication with the first central body.

3. The acoustic panel of claim 2, wherein the first unit cell includes a third lateral tube, disposed on and in fluid communication with the first central body, and a fourth lateral tube, opposite the third lateral tube and disposed on and in fluid communication with the first central body.

4. The acoustic panel of claim 3, wherein each of the first axial tube, the second axial tube, the first lateral tube, the second lateral tube, the third lateral tube and the fourth lateral tube are in fluid communication with each other via the first central body.

5. The acoustic panel of claim 4, wherein at least one of the first axial tube, the second axial tube, the first lateral tube, the second lateral tube, the third lateral tube or the fourth lateral tube is completely sealed.

6. The acoustic panel of claim 4, wherein at least one of the first axial tube, the second axial tube, the first lateral tube, the second lateral tube, the third lateral tube or the fourth lateral tube is completely sealed via the cell wall, wherein the cell wall is configured to block a flow of fluid therethrough.

7. The acoustic panel of claim 4, wherein at least one of the first axial tube, the second axial tube, the first lateral tube, the second lateral tube, the third lateral tube or the fourth lateral tube is partially sealed.

8. The acoustic panel of claim 4, wherein at least one of the first axial tube, the second axial tube, the first lateral tube, the second lateral tube, the third lateral tube or the fourth lateral tube is partially sealed via a mesh configured to partially restrict a flow of fluid therethrough.

9. The acoustic panel of claim 2, further comprising a second unit cell interconnected to the first unit cell, the second unit cell having a second central body and a pair of axial tubes disposed and a pair of lateral tubes disposed on and in fluid communication with the second central body.

10. The acoustic panel of claim 9, wherein the first lateral tube of the first unit cell is interconnected to one of the pair of lateral tubes of the second unit cell.

11. The acoustic panel of claim 10, further comprising a third unit cell interconnected to the first unit cell and a fourth unit cell interconnected to the second unit cell and to the third unit cell, wherein each of the first unit cell, the second unit cell, the third unit cell and the fourth unit cell are comprised within a layer of unit cells, wherein a hole is formed extending between the first unit cell, the second unit cell, the third unit cell and the fourth unit cell, wherein the layer of unit cells is one of a plurality of layers of unit cells.

12. An acoustic panel, comprising:
   a plurality of supercells forming an acoustic attenuating structure, the plurality of supercells including a first supercell and a second supercell, wherein:
   the first supercell tuned to a first frequency;
   the second supercell tuned to a second frequency that is different from the first frequency, and
   each of the plurality of supercells comprises:
   a facesheet having a plurality of perforations;
   a back plate parallel to the facesheet;
   a cell wall contacting the facesheet and the back plate, wherein the cell wall is substantially orthogonal to the facesheet and the back plate; and
   a first periodic structure having a first unit cell, a second unit cell, a third unit cell and a fourth unit cell, wherein each of the first unit cell, the second unit cell, the third unit cell and the fourth unit cell includes a central body interconnected via a plurality of lateral tubes extending from the central body, the first periodic structure forming a first lateral layer of unit cells, wherein the facesheet, the back plate, and the cell wall is in fluid communication with the first periodic structure.

13. The acoustic panel of claim 12, further comprising a second periodic structure, the second periodic structure forming a second lateral layer of unit cells interconnected to the first lateral layer of unit cells, wherein the second lateral layer of unit cells is interconnected to the first lateral layer of unit cells via a plurality of axial tubes.

14. The acoustic panel of claim 13, wherein the first lateral layer of unit cells and the second lateral layer of unit cells each comprise a plurality of holes extending axially between adjacent pairs of unit cells that comprise the first lateral layer of unit cells and the second lateral layer of unit cells and wherein the plurality of holes defines a space exterior to the first lateral layer of unit cells, the space being either partially restricted or completely restricted by a hole mesh.

15. An acoustic panel, comprising:
   a plurality of supercells, each of the plurality of supercells comprising:
   a first periodic structure having a first unit cell, a second unit cell, a third unit cell and a fourth unit cell, wherein each of the first unit cell, the second unit cell, the third unit cell and the fourth unit cell includes a central body interconnected via a plurality of lateral tubes extending from the central body, the first periodic structure forming a first lateral layer of unit cells;
an outer facesheet parallel to the first periodic structure;
a back plate parallel to the outer facesheet; and
a cell wall contacting the outer facesheet and the back plate, wherein the cell wall is substantially orthogonal to the outer facesheet and the back plate, the cell wall further comprising an outer facesheet wall portion, wherein the outer facesheet, the first periodic structure, and the outer facesheet wall portion define an airgap, wherein:
the outer facesheet, the back plate, and the cell wall are configured to enclose the first periodic structure, and
the cell wall of a first of the plurality of supercells is disposed adjacent to, and is separate from, the cell wall of a second of the plurality of supercells.

16. An acoustic panel of claim 15, further comprising an inner facesheet having a plurality of perforations, wherein the inner facesheet is disposed between the first periodic structure and the outer facesheet, wherein the inner facesheet is parallel to the outer facesheet, wherein the outer facesheet, the inner facesheet, and the outer facesheet wall portion define the airgap, wherein the inner facesheet, the back plate, and the cell wall are in fluid communication with the first periodic structure, wherein the inner facesheet, the back plate, and the cell wall are configured to enclose the first periodic structure.

17. An acoustic panel of claim 15, wherein the outer facesheet is a non-permeable membrane.

18. An acoustic panel of claim 15, wherein the outer facesheet is a microporous membrane.

19. An acoustic panel of claim 15, wherein the cell wall defines a plurality of apertures.

20. The acoustic panel of claim 12, wherein:
the first supercell is placed in a first position within the plurality of supercells, and
the second supercell is placed in a second position within the plurality of supercells.

* * * * *